(12) United States Patent
Raju et al.

(10) Patent No.: US 9,483,752 B1
(45) Date of Patent: *Nov. 1, 2016

(54) MULTI-USER THIN CLIENT

(75) Inventors: SriramKumar Raju, Bangalore (IN); Jyothi Bandakka, Bangalore (IN)

(73) Assignee: Wyse Technology L.L.C., San Jose, CA (US)

( * ) Notice: Subject to any disclaimer, the term of this patent is extended or adjusted under 35 U.S.C. 154(b) by 278 days.

This patent is subject to a terminal disclaimer.

(21) Appl. No.: 13/492,771

(22) Filed: Jun. 8, 2012

(51) Int. Cl.
*G06F 15/16* (2006.01)
*G06Q 10/10* (2012.01)
*H04L 29/06* (2006.01)
*H04L 29/08* (2006.01)

(52) U.S. Cl.
CPC .............. *G06Q 10/10* (2013.01); *H04L 29/06* (2013.01); *H04L 29/08072* (2013.01)

(58) Field of Classification Search
USPC ................................................. 709/204, 205
See application file for complete search history.

(56) References Cited

U.S. PATENT DOCUMENTS

| | | | | |
|---|---|---|---|---|
| 7,949,705 B1* | 5/2011 | Smith | ...................... | H04L 67/08 345/536 |
| 2007/0005693 A1* | 1/2007 | Sampath | ................. | H04L 67/30 709/204 |
| 2009/0100129 A1* | 4/2009 | Vigil et al. | ..................... | 709/203 |
| 2011/0296043 A1* | 12/2011 | Sutton | .................... | G06Q 10/10 709/229 |
| 2012/0268650 A1* | 10/2012 | Song | ................... | G06F 13/4022 348/441 |
| 2013/0042012 A1 | 2/2013 | Lewis et al. | | |

OTHER PUBLICATIONS

Office Action mailed Apr. 24, 2014 for U.S. Appl. No. 13/492,773, filed Jun. 8, 2012, 22 pages.

* cited by examiner

*Primary Examiner* — Vivek Srivastava
*Assistant Examiner* — Hermon Asres
(74) *Attorney, Agent, or Firm* — Baker Botts L.L.P.

(57) ABSTRACT

System and method enabling multiple users to simultaneously share a client computing device are disclosed. Method includes retrieving a plurality of I/O device groups, wherein a first I/O device group in the plurality of I/O device groups is associated with a first group of input or output (IO) devices locally connected to a client computing device, and wherein a second I/O device group in the plurality of I/O device groups is associated with a second group of I/O devices locally connected to the client computing device. Method includes launching first and second instances of an application. Method includes associating the first instance of the application with the first I/O device group on the client computing device. Method includes associating the second instance of the application associated with the second I/O device group on the client computing device.

18 Claims, 19 Drawing Sheets

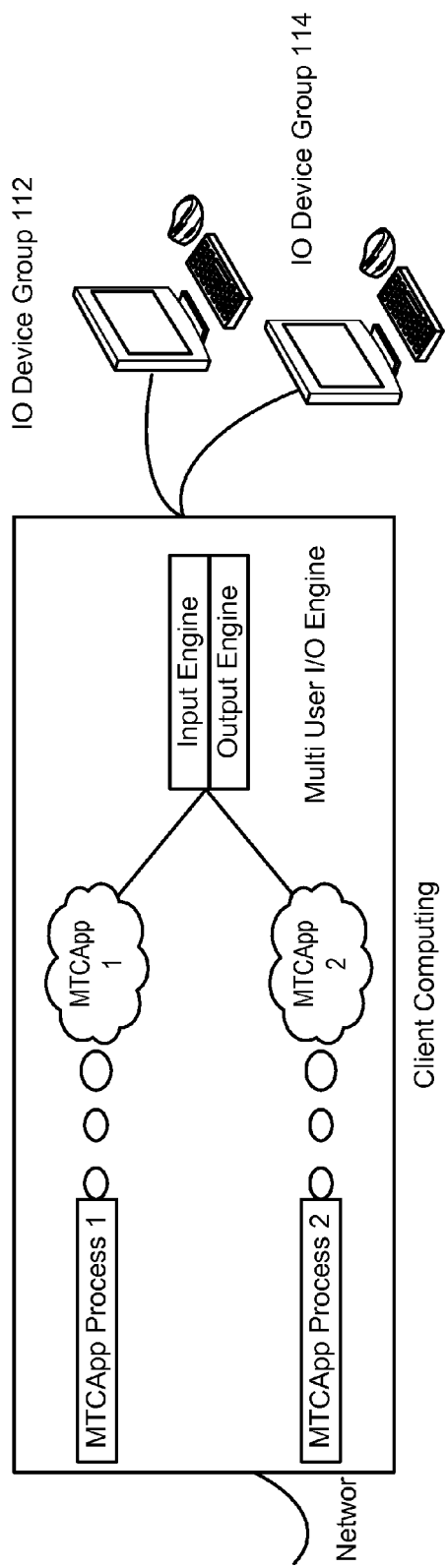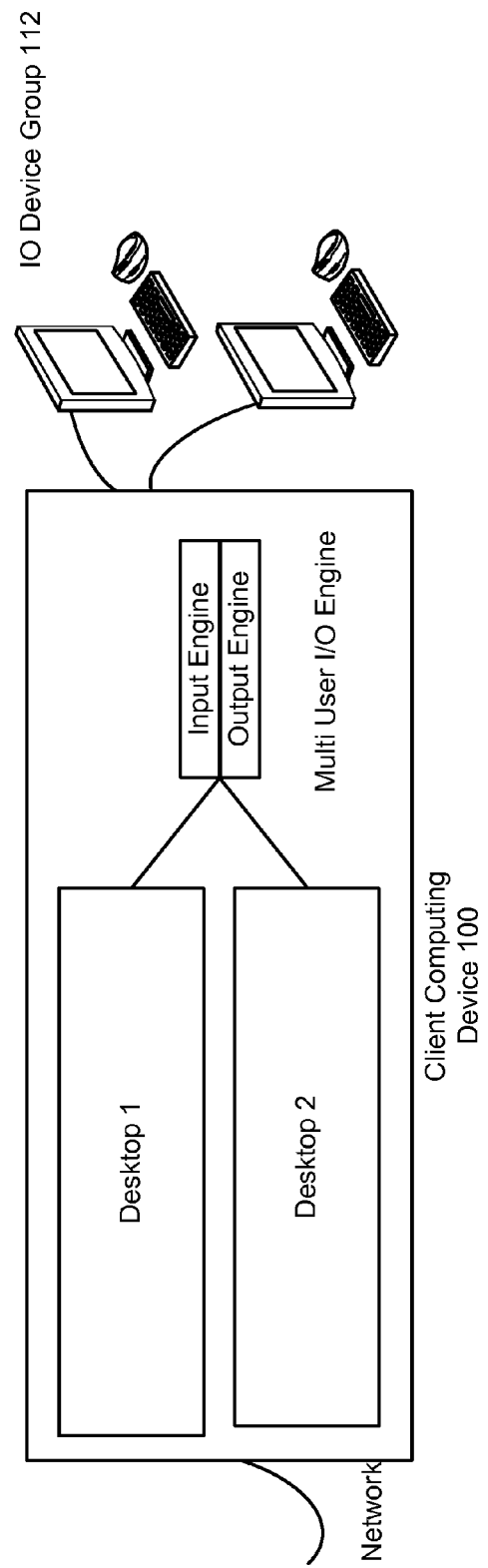

MULTI-USER THIN CLIENT

FIELD

The disclosure relates in general to client computing devices, and more particularly to multi-user thin clients.

BACKGROUND

Typically, each user requires one thin client machine, generally connected to several input and output devices for their computing needs. Such a system limits one user to be working on one thin client machine at any given point in time. The number of thin clients that are required by the customer may thus be the maximum number of simultaneous users required by the customer at any given point in time. In case of users requiring a small amount of computational time, for example, where the user may be using the thin client mainly to connect to one single remote session, the thin client machine and its software is not used at its capacity. In particular, for customers like school labs, providing individual thin client machines for every student may be too costly for their budgets.

SUMMARY

In some aspects, a method for enabling multiple users to simultaneously share a client computing device is provided. The method may include facilitating detecting of a plurality of input or output (I/O) devices connected to a client computing device. The method may include facilitating assigning of the detected plurality of I/O devices to a plurality of I/O device groups, wherein each I/O device group comprises of one or more of the detected plurality of I/O devices, wherein the plurality of I/O device groups facilitate the client computing device to be simultaneously shared by multiple users of the client computing machine.

In some aspects, a non-transitory machine-readable medium comprising instructions stored therein, the instructions executable by one or more processors to perform one or more operations, is provided. The instructions may include code for causing the one or more processors to facilitate detecting of a plurality of input or output (I/O) devices connected to a client computing device. The instructions may include code for causing the one or more processors to facilitate assigning of the detected plurality of I/O devices to a plurality of I/O device groups, wherein each I/O device group comprises of one or more of the detected plurality of I/O devices, wherein the plurality of I/O device groups facilitate the client computing device to be simultaneously shared by multiple users of the client computing machine.

In some aspects, an apparatus is provided. The apparatus may include one or more modules configured to facilitate detecting of a plurality of input or output (I/O) devices connected to a client computing device. The apparatus may include one or more modules configured to facilitate assigning of the detected plurality of I/O devices to a plurality of I/O device groups, wherein each I/O device group comprises of one or more of the detected plurality of I/O devices, wherein the plurality of I/O device groups facilitate the client computing device to be simultaneously shared by multiple users of the client computing machine.

In some aspects, a method for enabling multiple users to simultaneously share a client computing device is provided. The method may include retrieving a plurality of I/O device groups, wherein a first I/O device group in the plurality of I/O device groups is associated with a first group of input or output (IO) devices locally connected to a client computing device, and wherein a second I/O device group in the plurality of I/O device groups is associated with a second group of I/O devices locally connected to the client computing device. The method may include launching first and second instances of an application. The method may include associating the first instance of the application with the first I/O device group on the client computing device. The method may include associating the second instance of the application with the second I/O device group on the client computing device.

In some aspects, a non-transitory machine-readable medium comprising instructions stored therein, the instructions executable by one or more processors to perform one or more operations, is provided. The instructions may include code for causing the one or more processors to retrieve a plurality of I/O device groups, wherein a first I/O device group in the plurality of I/O device groups is associated with a first group of input or output (IO) devices locally connected to a client computing device, and wherein a second I/O device group in the plurality of I/O device groups is associated with a second group of I/O devices locally connected to the client computing device. The instructions may include code for causing the one or more processors to launch first and second instances of an application. The instructions may include code for causing the one or more processors to associate the first instance of the application with the first I/O device group on the client computing device. The instructions may include code for causing the one or more processors to associate the second instance of the application with the second I/O device group on the client computing device.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

FIGS. 3A-3B illustrate two possible approaches for providing multi-user sharing capabilities for one client computing device.

DETAILED DESCRIPTION

Figure 1A:
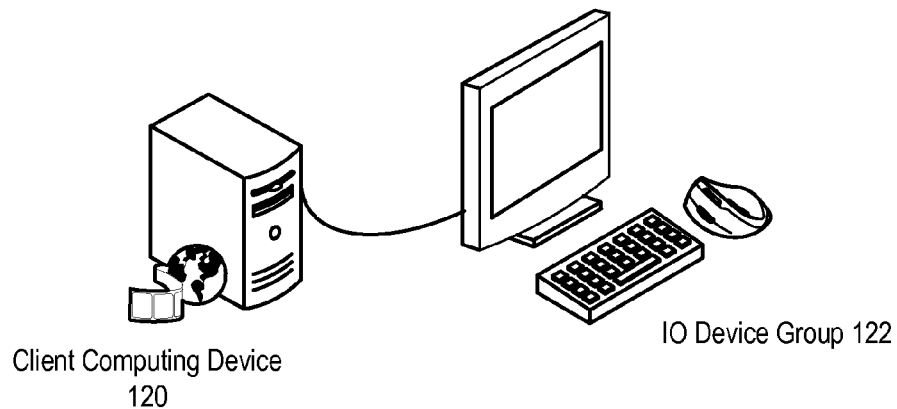
FIGS. 1A-1B illustrate client computing device configurations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In various aspects, the subject technology facilitates sharing of one client computing device (e.g., a thin client, personal computer, laptop computer, desktop computer, or any other computing device) by multiple users simultaneously. In some implementations, a plurality of input/output devices (I/O devices) are locally connected to the client computing device. Input devices may include a keyboard, a mouse or other pointing input device, a microphone, a camera, a touchpad, a track ball, or any other type of device enabling data input to the client computing device. Although some aspects of the subject technology are described using an example of a mouse, it is to be appreciated that other types of pointing devices may be used including, for example, a track pad, a track ball or other type of pointing device. Output devices may include a monitor, a speaker, or any other type of device enabling data output from the client computing device.

As used herein, a "local" device of the client computing device, or a device "locally" connected to the client computing device, may be a device directly connected to the client computing device using one or more wires or connectors (e.g., physically connected to the client computing device), or a device directly connected to the client computing device using a wireless link (e.g., Bluetooth).

In various aspects, the subject technology provides systems and methods for grouping a plurality of I/O devices connected or accessible to a client computing device, for enabling sharing of the computing device by multiple users simultaneously. In one aspect, a process for grouping devices iterates through the I/O devices connected to the client computing device, assigning each device to an I/O group. This results in a plurality of I/O device groups, each group having one or more input or output devices assigned to the group. The decision of which I/O device is to be added to which group may be provided by one or more users of the client computing device, or may be system determined. The grouping of I/O devices, otherwise stated as the mapping of I/O devices to respective groups, may persist on the client computing device or on a remote machine for subsequent use, for example, to provide I/O device groups for multiple users to share the client computing device.

In one aspect, an administrator (admin) application may be provided for an administrator user of a client computing device. Such an admin application may provide an interface, displaying the available or accessible I/O devices for the client computing device or for another client computing device (e.g., to enable administration of device grouping for remote client computing devices) to an administrator logged on. The administrator may then use the application to assign the listed I/O devices to a plurality of I/O device groups. The admin application may then store the grouping information for subsequent use as discussed herein.

In another aspect, a software module may enumerate through I/O devices connected or accessible to a client computing device, and assign the detected I/O devices to a plurality of I/O device groups. For example, the module may assign I/O devices to groups in the order of enumeration, one device of a particular type (e.g., keyboard, monitor, mouse, speaker, etc.) per group. This may result in multiple I/O device groups, each with one or more input devices and one or more output devices that may later be used by one or more users for sharing the client computing device. For example, where one client computing device is connected to two keyboards, two mice, and two monitors, one of each may be assigned to a separate group (e.g., based on the order of enumeration), resulting in two I/O groups (e.g., group1 and group2) of devices. I/O device groups may contain different types of I/O devices, e.g., one group may contain a keyboard, a mouse, a monitor, and a speaker, while another group may contain a keyboard and a monitor.

In various aspects, as a client computing device boots up, a boot process accesses the I/O device groups' information (e.g., stored either locally or on a remote machine as discussed above) and instantiates (launches) one instance of an application per group of I/O devices (a "Boot-process approach"), associating one instance of the application with one I/O device group. The application may be a desktop application (e.g., Windows® desktop, or Linux® desktop) or another application that enables a user to launch one or more remote sessions (e.g., an RDP, ICA, VMView or any other remote session connecting the client computing device to a back-end server) or any other local application on the computing device. RDP is a Microsoft® protocol to connect a terminal server and terminal server client. ICA is a Citrix® protocol to establish remote sessions between client computing devices to Windows® servers with Citrix's WinFrame, Citrix ZenApp (formerly called Metaframe/Presentation Server) and Citrix ZenDestop products. VMView is VMWares® desktop virtualization product which provides remote desktop capabilities using VMWare's virtualization technology.

Any display output arising from the launched instances of the application may then be displayed, where the display output from each instance of the application is displayed on an output device (e.g., a monitor) in the respective I/O group. For example, as discussed above where two groups exist, group1 and group2, each having one monitor, one mouse, and one keyboard, the display output for each instance of a Windows desktop may be displayed on the monitor in the respective I/O group upon the client computing device's boot process. Each Windows desktop instance is associated with one group, either group1 and group2. As such, at least two users may be enabled to share the client computing device simultaneously, each via its own desktop instance. Other types of output may be routed to other types of output devices (e.g., sound to speakers, etc.).

In various aspects, an input/output (I/O) data manager is provided, where the data manager listens for output or input data received at a client computing device (e.g., either from user input or from application data) and routes the received I/O data to either an appropriate device in one of the I/O device groups or to the appropriate instance of the application. For example, where two I/O groups exist, group1 and group2, the I/O data manager may initially, at boot time, route display output of a first Windows desktop instance to group1 and route display output of a second Windows desktop instance to group2. As such, the first Windows instance is associated with I/O devices in group1 and the second Windows instance is associated with I/O devices in group2. When the I/O data manager receives input from one of the input devices, e.g., by user initiated input or other applications' initiated input, the I/O data manager will forward the input data to the respective application instance associated with the I/O group comprising the I/O device from which the input is received. Similarly, the I/O data manager will listen for output received from application instances associated with the I/O groups, and forward the output from one of the application instances to an output device in the I/O device group associated with the application instance.

In various aspects, a plurality of I/O groups, each with one or more input or output devices assigned to it, may be allocated to respective users. In the example discussed above, group1 may be assigned to a user1 and group2 may be assigned to a user2. The assignment may be provided by a user, such as the admin user discussed above or may be system determined. One I/O group may be assigned to more than one user login (e.g., group1 may be assigned to a user1 and a user3). The allocated user, then upon login and authentication may be associated with the I/O group allocated to it.

In various aspects, when a user logs onto a client computing device, one I/O group is selected from a plurality of I/O groups, where the selected group comprises the device from which the user logged on. The selected group is assigned to that user, and one instance of an application is launched for that user and associated with the selected I/O group (an "On-demand approach"). As a second user logs onto the client computing device, another I/O group from the plurality of I/O groups is selected, where the selected group comprises the device from which the second user logged on. The selected group is assigned to the second user, and a second instance of the application is launched and associated with the second user and with the I/O group selected for the second user. The number of users that may simultaneously share one client computing devices may be limited by the number of I/O groups, where each simultaneous user is assigned to one group. Users may log onto the client computing device using log-in screens provided by the application (e.g., custom log-in screens provided by the application), in which instances of the application are launched upon users logging onto the client computing device as described further below.

For example, using either of the approaches discussed above (Boot-process or On-demand approach), where a client computing device has two groups of I/O devices, group1 and group2, two simultaneous users may share the client computing device. Assuming, that group1 is associated with a user1 and group2 is associated with a user2, then any output for user1, as received from a first instance of an application launched for the user1, is directed to one or more output devices assigned to group1. Similarly for user2, any output for user2, as received from a second instance of the application launched for user2, is directed to one or more output devices assigned to group2. Also, input from user1 is received from one or more input devices in group1 and forwarded to the first instance of the application and input from user2 is received from one or more input devices in group2 and forwarded to the second instance of the application. In various aspects, the logic for directing output or input for multiple users to the appropriate I/O groups or application instances may be performed by a input/output management module (e.g., I/O data manager module 425 as discussed in more details below).

Systems and methods as described for multi-user sharing of a client computing device may have the advantage of more fully utilizing capacity of the client computing device (e.g., CPU, memory, disk space, etc.). Additionally, multi-user sharing capabilities may reduce costs by, for example, an organization or entity requiring fewer client computing devices to accommodate a set of users simultaneously.

Examples of Client Computing Device Configurations

Figure 1B:
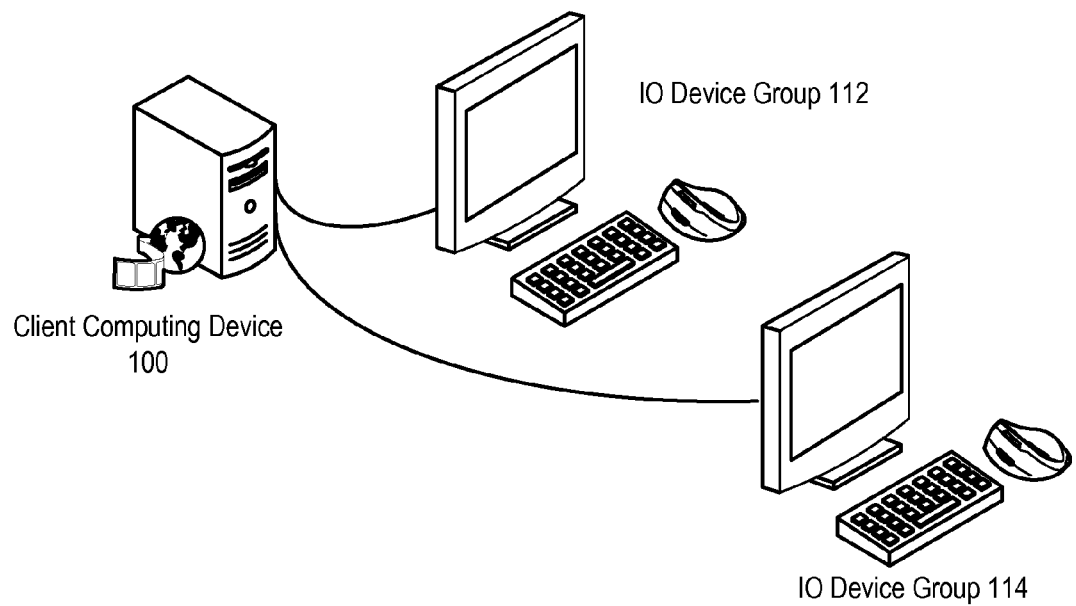

FIGS. 1A and 1B illustrate examples of client computing device configurations. FIG. 1A illustrates a client computing device 120 locally connected to one group of I/O devices. The client computing device 120 is shown to be connected to I/O device group 122, comprising a monitor, a keyboard, and a mouse. FIG. 1A illustrates a client computing device configuration that typically enables a single user at any one given point in time to use the resources of client computing device 120. For example, one physical user may use the keyboard and mouse of I/O device group 122 to provide input for various applications the user accesses via the monitor of I/O device group 122. Output generated by client computing device 120 or received at client computing device 120 (e.g., from a remote server or applications running on it) may then be displayed to the user on the monitor of I/O device group 122.

FIG. 1B illustrates another client computing device configuration, where a client computing device 100 is locally connected to two groups of I/O devices, 112, and 114. Each I/O device group 112 and 114 is shown having one monitor, one keyboard, and one mouse. FIG. 1B illustrates a client computing device configuration that may be used by the subject technology of this disclosure. For example, the configuration of FIG. 1B may enable two users at any one given point in time to simultaneously share the resources of client computing device 120. For example, one physical user may use the keyboard and mouse of I/O device group 112 to provide input for various applications the user accesses via the monitor of I/O device group 112 (e.g., display from an instance of an application associated with group 112). Similarly, a second user may use the keyboard and mouse of I/O device group 114 to provide input for various applications the user accesses via the monitor of I/O device group 114 (e.g., display from a second instance of the application associated with group 114).

Output generated by client computing device 100 or received at client computing device 100 (e.g., from a remote server or applications running on it) may then be displayed on either the monitor of I/O device group 112 or the I/O device group 114, depending on which device group the output is for (e.g., as determined by the association of an application instance with an I/O device group). FIG. 1B illustrates a possible configuration of one client computing device being shared by two users, using the illustrated two groups of I/O device, according to the subject technology of this disclosure.

Examples of Client Computing Device Configurations

Figure 2A:
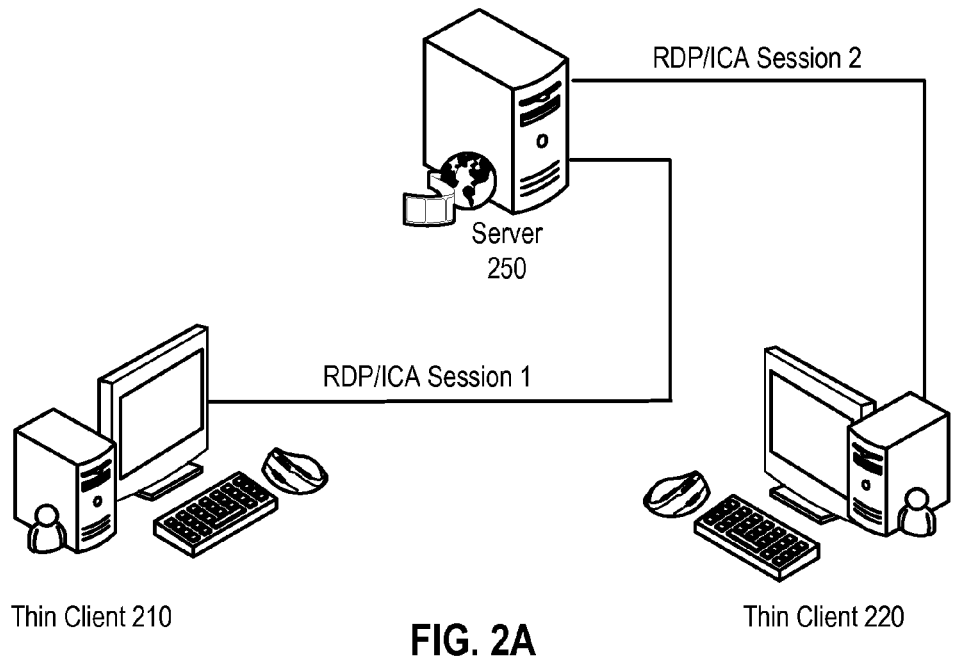
FIGS. 2A-2B illustrate two client computing device configurations, with remote server connections.
Figure 2B:
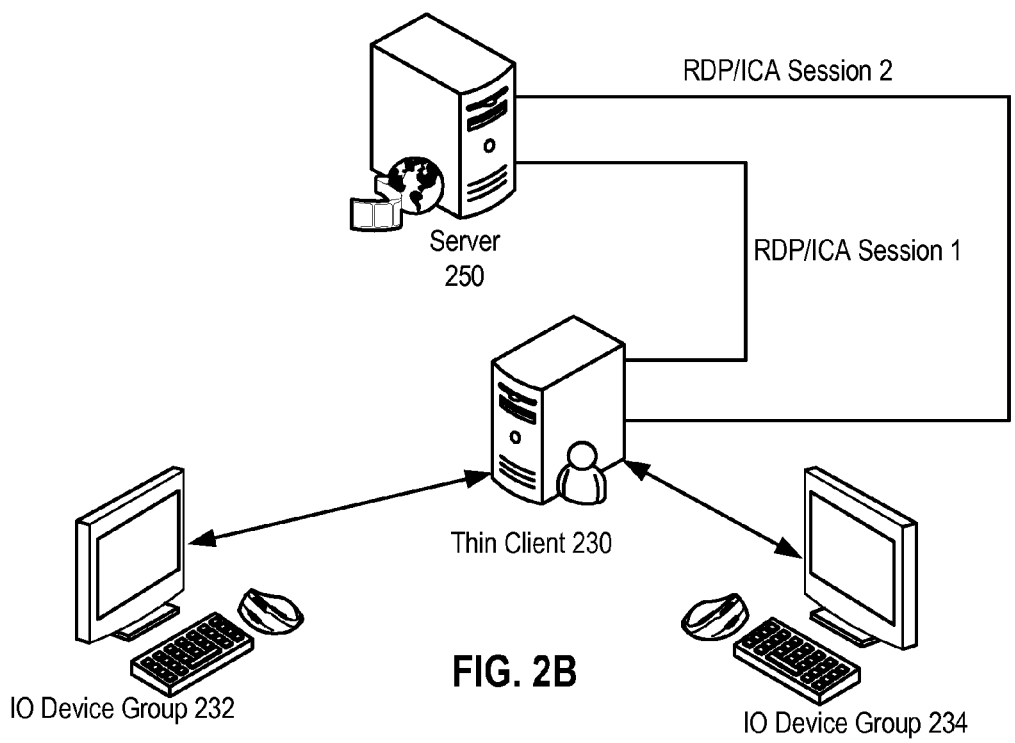

FIGS. 2A and 2B illustrate examples of two client computing device configurations, with the client computing devices shown connected to a remote server, to enable remote server session (e.g., RDP or ICA) capabilities for the client computing devices illustrated. A remote session may be established using a remote desktop protocol (RDP) by Microsoft® for client computing devices to Windows® servers, an independent computing architecture (ICA) protocol by Citrix®, or other remote session protocol. Both RDP and ICA are examples of protocols that enable remote session capabilities. Although aspects of the subject technology are described herein using the examples of the RDP and ICA protocols, it is to be appreciated that the subject technology is not limited to these examples and that any suitable remote access protocol may be used.

FIG. 2A depicts two thin clients 210 and 220, where each thin client is connected to one monitor and one keyboard. Each thin client 210 and 220 can establish its own RDP/ICA session, session 1 and session 2, with the server 250, as shown in FIG. 2A. FIG. 2A illustrates a client computing device configuration in which only one user is enabled to use the resources of a thin client, either 210 or 220, at any given point in time.

FIG. 2B, on the other hand, illustrates a client computing device configuration that enables multiple users to share the resources of a single thin client machine simultaneously using the subject technology of this disclosure. FIG. 2B shows a thin client 230 connected to two groups of I/O devices, group 232 and group 234. The thin client 230 can establish two remote RDP/ICA sessions, session 1 and session 2, with server 250, one session for each group of I/O devices, as shown in FIG. 2B. FIG. 2B illustrates a client computing configuration, where using the subject technology two users may simultaneously share the resources of thin client 230, e.g., to provide remote session capabilities to the two users simultaneously. For example, a user 1 may use I/O device group 232 to establish a remote session 1 with the server 250 and a second user 2 may use I/O device group 234 to establish another remote session 2 with the same server 250 or different server, using the subject technology.

FIG. 2B illustrates the use of the subject technology for enabling multiple users to share one thin client for remote session capabilities. However, the subject technology may be used by multiple users to share any other application capabilities provided by a client computing device. For example, multiple users may be provided with multiple instances of a desktop shell (e.g., a Windows® shell or Linux® shell environment), one instance per user per I/O device group. As such, each user, using a particular I/O device group then may access a host of application capabilities provided by the instance of the shell provided for that user. As another example, multiple users may be provided with multiple instances of another application (e.g., a multi-user thin client application that enables a user to launch remote sessions, e.g., an RDP or ICA session and any other local application on the computing device), one instance per user per I/O device group. One I/O device group may be shared by more than one user at different times. For example, a user1 may use a first I/O device group in the mornings and another user, user 2 may use the same I/O device group in the afternoons.

Examples of Two Approaches for Multi-User Client Computing Device Sharing

FIGS. 3A and 3B illustrate two possible approaches for providing multi-user sharing capabilities for one client computing device (e.g., a thin client). FIG. 3A illustrates a client computing device 100, connected to two I/O device groups, 112 and 114. Client computing device 100 comprises an input engine and an output engine (I/O engine) for managing the I/O for the two I/O device groups 112 and 114. The I/O engine is further shown in communication with two instances of a remote connection manager application or multi-user thin client application (MTCApp), MTCApp 1 and MTCApp 2. MTCApp 1 is shown to be associated with an MTCApp process 1 and MTCApp 2 is shown to be associated with a MTCApp process 2. An MTCApp instance may, for example, enable a respective user to establish remote sessions, such as RDP and ICA sessions. As such, FIG. 3A illustrates a configuration where two users may simultaneously use client computing device 100, via an I/O device group 112 and 114 respectively, to establish their own remote session via MTCApp 1 and MTCApp 2 instances.

The I/O engine, via its connectivity to the I/O device groups 112 and 114, manages input from the I/O device groups 112 and 114. The I/O engine routes the input from each I/O group to the associated instance of the MTCApp, MTCApp 1 or MTCApp 2. For example, the I/O engine may route the input from one or more input devices in group 112 to MTCApp 1 and route input from one or more input devices in group 114 to MTCApp 2. The I/O engine also receives output from MTCApp 1 or MTCApp 2 and redirects the output to the proper I/O device group 112 or 114. For example, the I/O engine may route output from MTCApp 1 to one or more output devices in group 112 and route output from MTCApp 2 to one or more output devices in group 114.

FIG. 3B, similar to 3A, illustrates another approach for multi-user sharing capabilities for client computing device 100. The difference being that in FIG. 3B two instances of desktops are shown to be running on client computing device 100, one per I/O device group 112 and 114. As such, FIG. 3B shows an example where two users may simultaneously use I/O device groups 112 and 114, each associated with its own instance of the desktop, desktop 1 or desktop 2. Similar to FIG. 3A, the input engine and output engine (I/O engine) is shown to be connected to the I/O device groups 112 and 114, and to the two desktop instances, desktop 1 and desktop 2. As such, the I/O engine is schematically depicted to be managing the directing of I/O traffic to the proper instance of the desktop and to the proper I/O device group.

For example, if a user1 is using I/O device group 112, associated with desktop 1, then interactions from user1 are directed to the process associated with desktop 1, and data from desktop 1 is directed to one or more output devices in I/O device group 112, for output to user1. Similarly, a user2, using I/O device group 114 is able to use the applications and functionalities provided by desktop 2 via the I/O engine directing the user2's input to desktop 2 and directing data received from desktop 2 to one or more output devices in I/O device group 114 for output to user2.

FIG. 3B illustrates a multi-user thin client sharing capability via use of multiple instances of desktop applications (e.g., Windows® or Linux® desktop process). As such, FIG. 3B shows one way by which multiple users may be able to use applications and other functionality (e.g., user preferences for desktop display, etc.) provided by a desktop process, via the management and directing of I/O traffic, e.g., using an I/O engine.

FIGS. 3A and 3B illustrate two examples of providing multi-user thin client sharing capabilities via either launching multiple instances of an MTCApp or multiple instances of a desktop application. However, any other application instances may instead be used to facilitate multiple users sharing one client computing device without deviating from the scope of this disclosure.

Example of Modules of Client Computing Device 100

Figure 4:
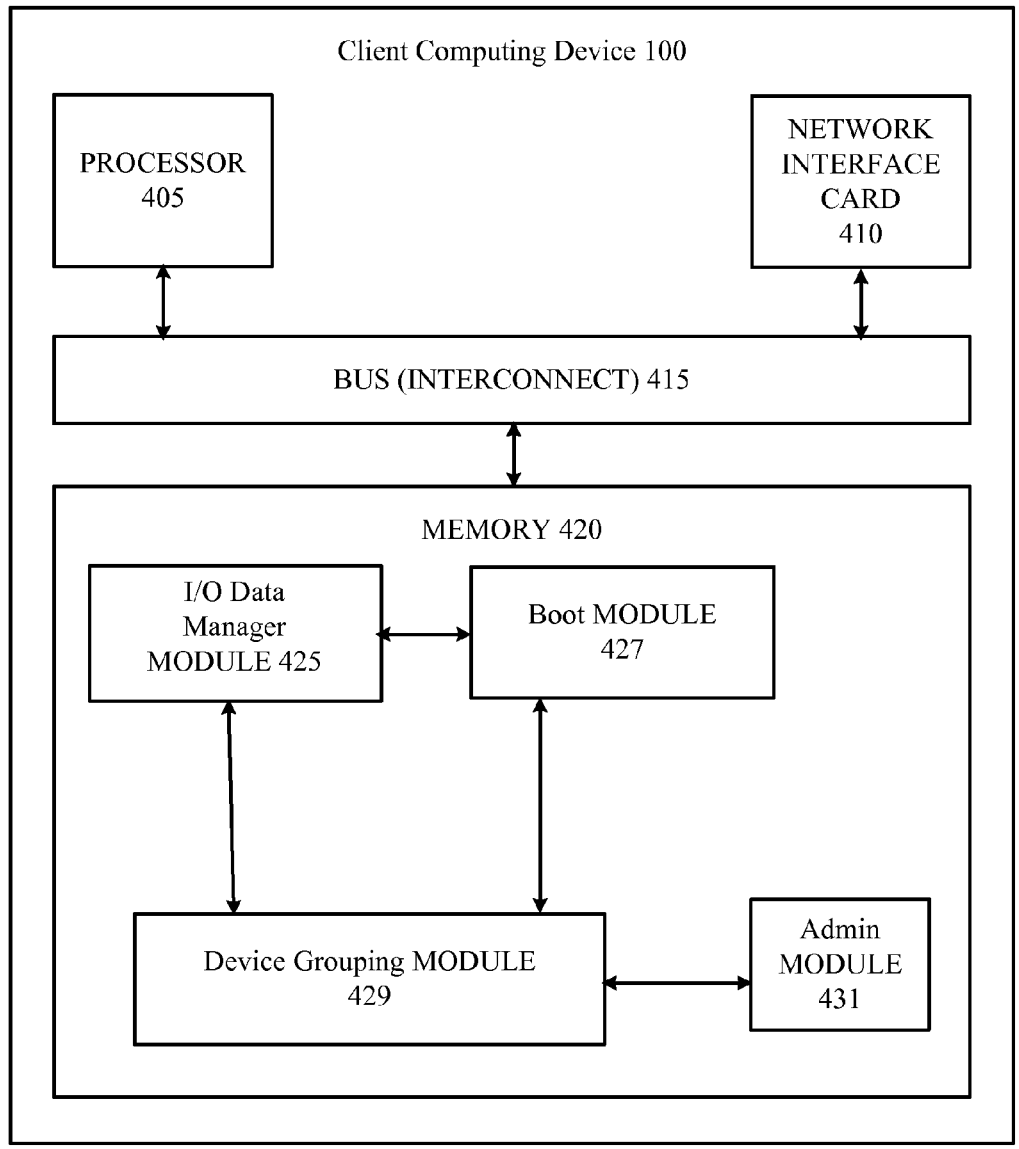
FIG. 4 illustrates an example of a client computing device in accordance with one aspect of this disclosure.

FIG. 4 illustrates an example of a client computing device 100 in accordance with one aspect of the subject technology. Client computing device 100 may, e.g., be a client computing device 100 of FIGS. 3A and 3B, connected to multiple groups of I/O devices for use by multiple users. As shown, the client computing device 100 includes a processor 405, a network interface card 410, and a memory 420 connected by a bus or interconnect 415.

The processor 405 functions to execute instructions that are provided to the processor 405 from the memory 420 and/or other storage locations. The network interface card 410 allows the client computing device 100 to connect to a network, such as the Internet, a cellular network, a local area network (LAN) or an intranet. The memory 420 stores data and instructions that can be implemented or modified by the processor 405.

As shown in FIG. 4, the memory 420 includes an I/O data manager module 425, a boot module 427, a device grouping module 429, and an admin module 431. I/O data manager module 425 may, for example, be the component for I/O engine as discussed for FIGS. 3A-3B. The I/O data manager module 425 is configured to receive input from input devices locally connected to client computing device 100. The I/O data manager module 425 is configured to manage input data received from multiple I/O device groups (as illustrated in FIGS. 3A-3B, device groups 112 and 114) and direct the received input data from each I/O group to the respective instance of an application (e.g., the MTCApp instance of FIG. 3A or desktop application instance of FIG. 3B). The I/O data manager module 425 is also configured to receive output data from the multiple instances of applications for multiple users and direct the output data from each instance to one or more output devices in the respective I/O device group.

I/O data manager module 425 is configured to communicate with device grouping module 429 to retrieve the association of devices in a device group. For example, device grouping module 429 may provide two I/O device groups (e.g., device groups 112 and 114 of FIGS. 3A-3B), each comprising one monitor, one keyboard, and one mouse. I/O data manager module 425 may also communicate with boot module 427 to receive information about which application instance is associated with which I/O device group. I/O data manager module 425 may then use the information about devices mapped to various I/O device groups, and information about application instances associated with one or more I/O device groups, for directing I/O traffic received by it as discussed above. As such, I/O data manager module 425 is configured to manage input output data for client computing device 100 in a multi-user sharing environment.

Boot module 427 may be configured to launch I/O data manager 425. In some aspects, a Boot module 427 is configured to launch multiple instances of an application for multiple I/O device groups connected to client computing device 100 (a Boot-process approach). For example, boot module 427 may launch two instances of the MTCApp, MTCApp 1 and MTCApp 2, as discussed for FIG. 3A or two instances of a desktop, desktop 1 and desktop 2, as discussed for FIG. 3B. Boot module 427 may communicate with device grouping module 429 to receive information about I/O device groups, for devices connected to client computing device 100. Boot module 427 may use the received I/O device grouping information to launch multiple instances of an application for the multiple I/O device groups, one instance per group. Boot module 427 may not always launch one instance of the application per I/O device group, e.g., when one device group is flagged as not being active or as being defective or malfunctioning, or for any other reason where a device group is not in use or may not be usable, etc. Boot module 427 may also be configured to communicate with I/O data manager module 425, providing I/O data manager module 425 information about which application process or instance is associated with which I/O device group (e.g., for later use by the I/O data manager module 425 for managing I/O traffic for client computing device 100 as discussed above).

In some aspects, a boot module 427 may not be used for launching multiple instances of an application for multiple users. Instead, application instances may be launched upon a first user logging in. For example, when a first user logs in (e.g., with an associated Windows® or Linux® login) to a client computing device 100, multiple instances of an application (e.g., the MTCApp or desktop application) may be launched. The number of instances of the application that are launched may be one instance per available I/O device group. The I/O device groups may be retrieved from a persistent store locally or remotely.

Multiple displays associated with the multiple launched instances of the MTCApp or other application (e.g., Windows® or Linux® desktop) may then be displayed, in which the display for each instance of the application is output to an output device (e.g., monitor) in the respective I/O device group for which the application is launched. In one aspect, the initial display output provided by an application instance may include a first screen, e.g., an application log-in screen, which can be used by a user to log onto the instance of the application displayed on the monitor on which the user is working.

In yet another aspect, application instances may be launched as users log on (an on-demand approach). For example, when a first user logs in (e.g., with an associated Windows® or Linux® login) to a client computing device 100, multiple instances of an application's log-in window are launched. The number of instances of the application's log-in window that are launched may be one log-in window instance per available I/O device group. The I/O device groups may be retrieved from a persistent store locally or remotely.

Subsequently, when a user logs onto the application via a first displayed log-in window, one instance of the application associated with the log-in window may be launched for that user. This instance of the application is associated with the I/O device group used by the user to log on. As a second user logs onto the application via a second displayed instance of the log-in window, a second instance of the application may be launched for the second user. The second instance of the application is associated with the I/O device group used by the second user to log on. As such, in the on-demand approach, instances of an application are launched as users logon onto the application, using the provided log-in windows/screens on their respective monitors.

In one aspect, the multiple instances of the application's login window may be launched automatically upon boot up without requiring a first user to log onto the computing device manually (e.g., by enabling standard auto login process of Windows® or Linux® systems).

Device grouping module 429 is configured to maintain information about I/O devices and their respective I/O device groups. Either the boot-process or on-demand approach may use information from device grouping module 429 for determining I/O device group information. Device grouping module 429 is configured to communicate with I/O data manager module 425 and boot module 427, to provide each with I/O device grouping information for their respective uses. Device grouping module 429 may also be configured to group I/O devices based on system configuration or preferences. For example, in some aspects the system may group devices based on order of enumeration of the I/O devices. When a particular type of device is detected (e.g., keyboard, monitor, mouse, speaker, etc.), it is allocated or assigned to an I/O device group. When another device of the same device type is found it is allocated to another I/O device group. The process may continue enumerating through all available I/O devices, allocating the I/O devices to groups as described. Such system configured I/O device groups may be based on any other criteria besides order of enumeration.

In other aspects, I/O device groups are formed based on user input (e.g., from an administrator user). Device grouping module 429 may be configured to provide (e.g., to admin module 431) a list of input/output devices, locally connected, to client computing device 100 for user selection for groups. Device grouping module 429 may also be configured to take assigned groups, e.g., from the admin user of admin module 431 discussed below, and maintain I/O device group information for future use (e.g., by I/O data manager module 425 or boot module 427). Device grouping module 429 may also be configured to persist mapping of I/O device groups to I/O devices on the client computing device 100 or on a remote server. The persisted I/O device group information may then be later used, e.g., by I/O data manager module 425 or boot module 427.

Admin module 431 may be configured to communicate with device grouping module 429 to receive a list of I/O devices connected to client computing device 100. Admin module 431 may also be configured to provide a display of the received list of I/O devices to an admin user. The admin user may then take the list of I/O devices and group them using the capabilities of admin module 431. The I/O device groups then may be communicated by admin module 431 to device grouping module 429.

Admin module 431 may reside on client computing device 100 or on a remote server (e.g., for remote configuration of I/O device groups). Admin module 431 may communicate with device grouping module 429 on more than one client computing device 100, in order to facilitate remotely managing client computing devices for I/O device grouping purposes.

Figure 5A:
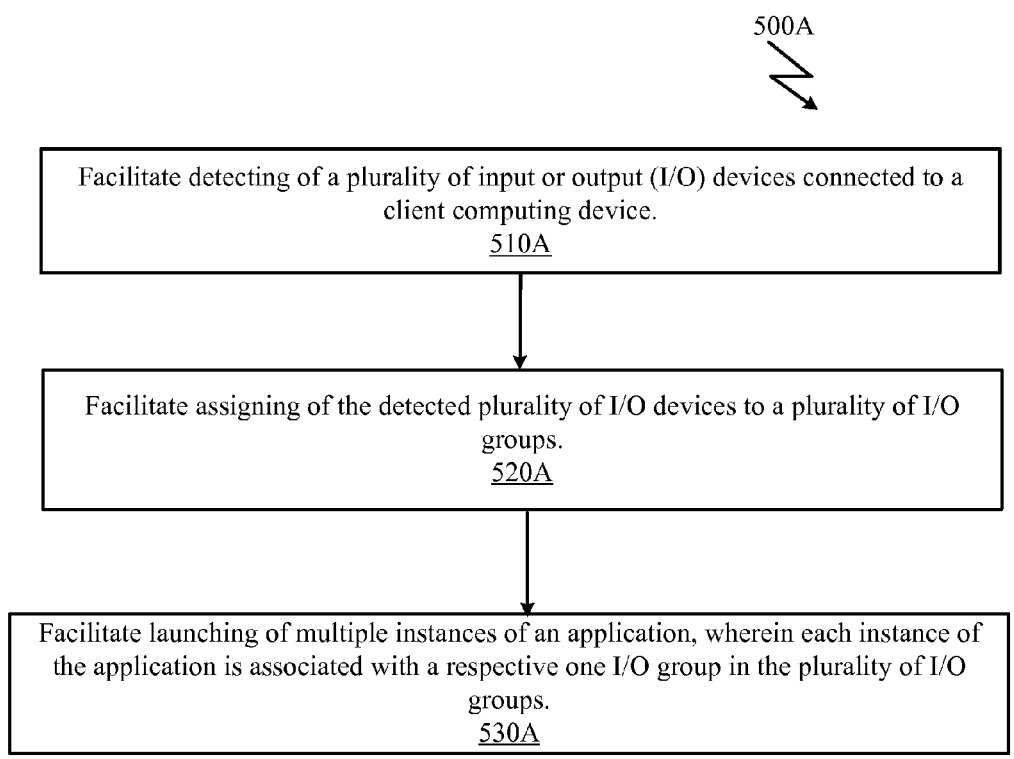
FIG. 5A is a flow chart illustrating an example of operations for multiple users sharing a client computing device.

Example of Process of Facilitating Multi-User Sharing of a Client Computing Device FIG. 5A is a flow chart illustrating an example process 500A for multiple users sharing a client computing device.

The process 500A begins at operation 510A, where a client computing device (e.g., the client computing device 100, via device grouping module 429) facilitates detecting of multiple input or output devices (I/O) locally connected to the client computing device. For example, the device grouping module 429 may facilitate detecting of I/O devices connected to client computing device 100, detecting two monitors, two keyboard, and two mice as discussed in FIGS. 3A-3B. The devices connected to the client computing devices may be wired to the client computing device 100 (e.g., via USB port) and/or may be wirelessly accessible by the client computing device 100 (e.g., via Bluetooth). The detected devices may include any input or output device accessible to the client computing device 100. In one aspect, client computing device 100 includes a module that is configured to detect multiple input or output devices locally connected to the client computing device.

In operation 520A, the client computing device 100 facilitates assigning the detected multiple I/O devices to multiple I/O device groups. For example, either the device grouping module 429 of client computing device 100 may facilitate assigning the detected I/O devices to I/O device groups, for example, based on the order of enumeration of the devices, or a user may assign detected I/O devices to I/O device groups, facilitated by, for example, admin module 431. In one aspect, client computing device 100 includes a module configured to assign the detected multiple I/O devices to multiple I/O device groups.

In operation 530A, the client computing device 100 facilitates launching of multiple instances of an application. For example, the boot module 429 of client computing device 100 may facilitate launching of one instance of an application per I/O device group, received from device grouping module 429. The launched application may, for example, be the MTCApp for FIG. 3A or desktop application of FIG. 3B. In another example, multiple instances of the application may be launched one at a time, as users log on to the client computing device (using a custom log-in window or screen associated with an application as discussed above). The launched instances of an application, as associated with multiple instances of I/O device groups, may then be used by multiple simultaneous users of the client computing device 100. In one aspect, client computing device 100 includes a module configured to launch the multiple instances of the application.

Figure 5B:
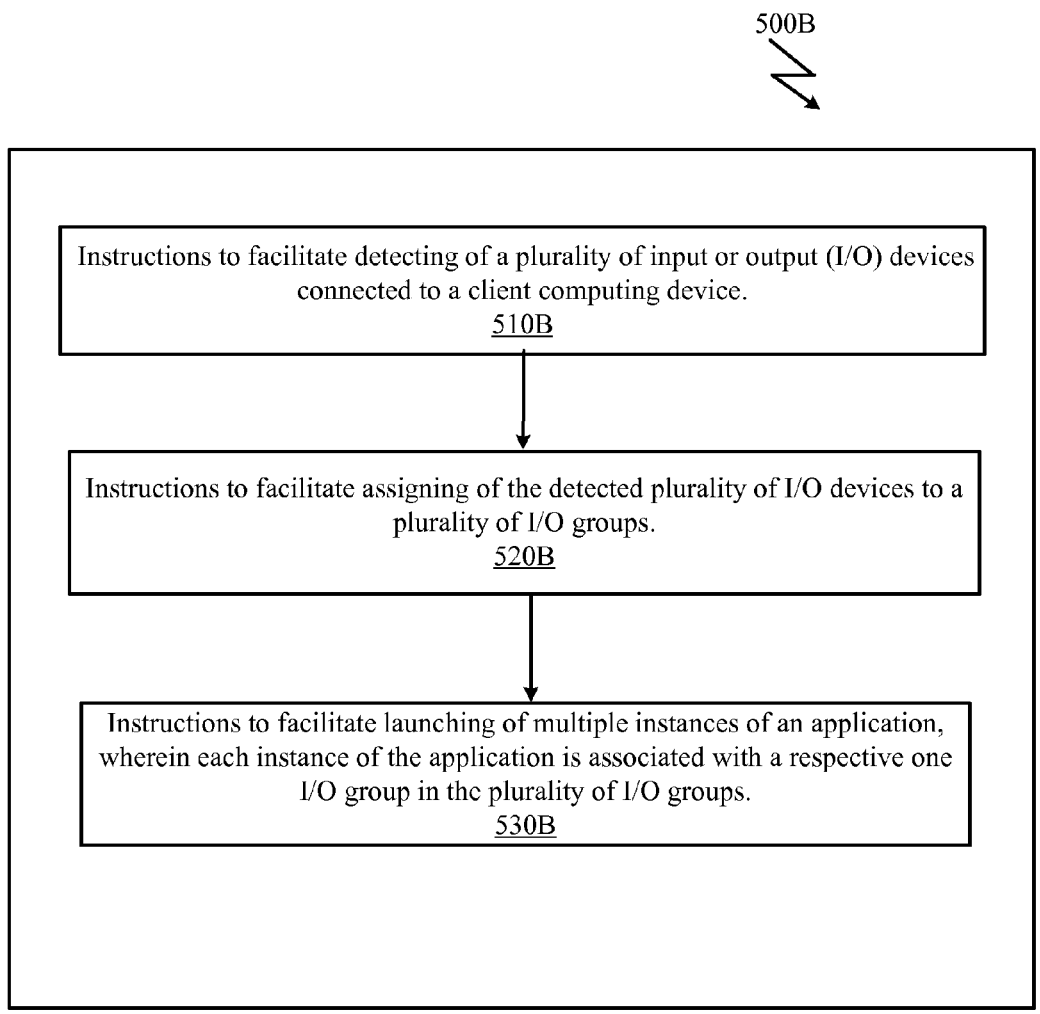
FIG. 5B is an example of a computer memory including instructions for operations of multiple users sharing a client computing device.

Example of Instructions for Operations for Multiple Users Sharing a Client Computing Device FIG. 5B is an example of a device 500B including instructions for operations of multiple users sharing a client computing device.

The device 500B may include instructions 510B to facilitate detecting of a plurality of input or output (I/O) devices connected to a client computing device.

The device 500B may include instructions 520B to facilitate assigning of the detected plurality of I/O devices to a plurality of I/O groups.

The device 500B may include instructions 530B to facilitate launching of multiple instances of an application, wherein each instance of the application is associated with a respective one I/O group in the plurality of I/O groups.

In one example, the device 500B comprises a machine-readable medium having software code stored thereon, and the software code includes the instructions described in FIG. 5B.

Figure 5C:
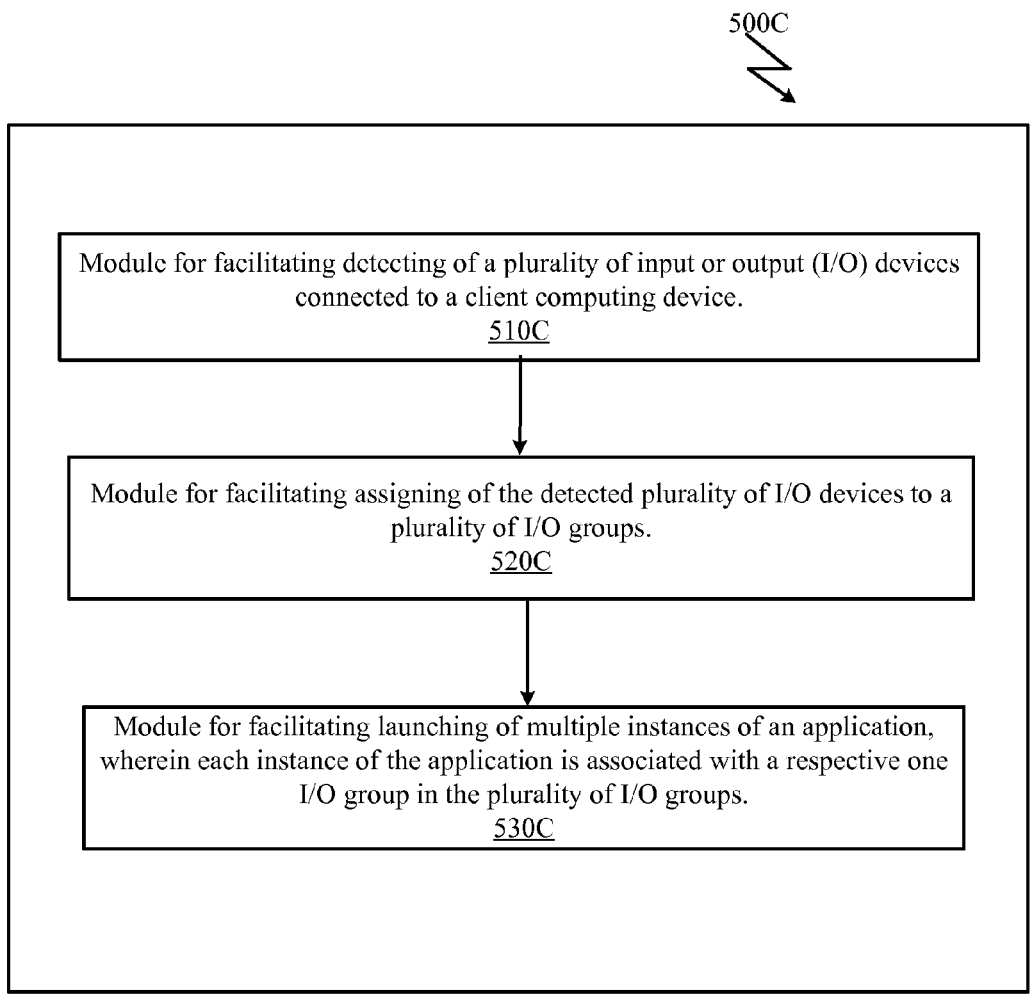
FIG. 5C is an example of a computer memory including one or more modules for operations for multiple users sharing a client computing device.

Example of One or More Modules for Operations of Multiple Users Sharing a Client Computing Device FIG. 5C is an example of a device 500C including one or more modules for operations for multiple users sharing a client computing device.

The device 500C may include a module 510C to facilitate detecting of a plurality of input or output (I/O) devices connected to a client computing device.

The device 500C may include a module 520C to facilitate assigning of the detected plurality of I/O devices to a plurality of I/O groups.

The device 500C may include a module 530C to facilitate launching of multiple instances of an application, wherein each instance of the application is associated with a respective one I/O group in the plurality of I/O groups.

In one example, the device 500C comprises a computer memory, and each of the modules (e.g., 510C, 520C, 530C) comprises software code that can perform its respective action/function as described. In one example, the device 500C comprises circuits and/or logic, and each of the modules (e.g., 510C, 520C, 530C) comprises circuit component(s) or logic component(s) that can perform its respective action/function as described.

Figure 6A:
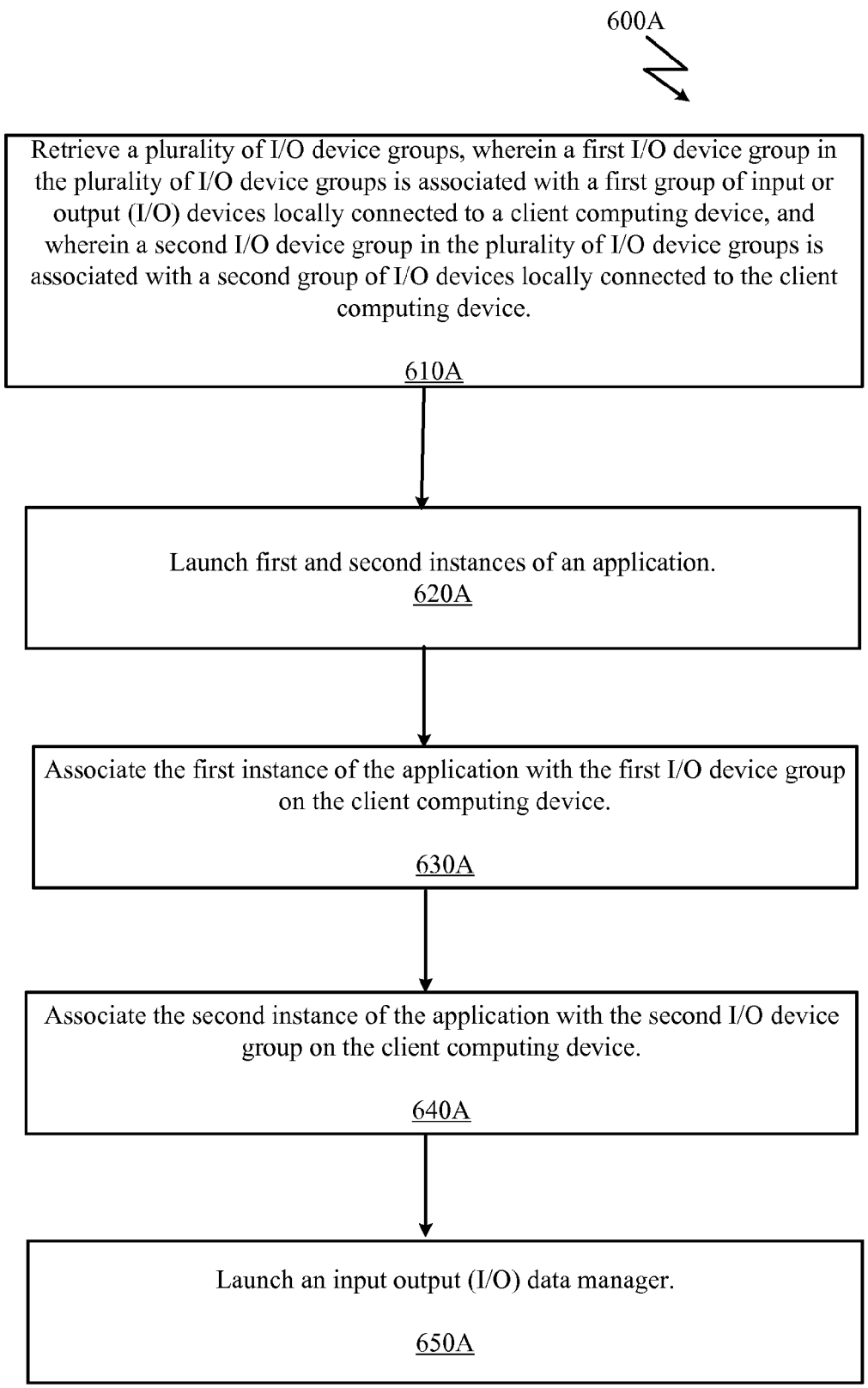
FIG. 6A is a flow chart illustrating another example of operations for multiple users sharing a client computing device.

Example of Process of Facilitating Multi-User Sharing of a Client Computing Device FIG. 6A is a flow chart illustrating an example process 600A for multiple users sharing a client computing device.

The process 600A begins at operation 610A, where a client computing device (e.g., the client computing device 100 via device grouping module 429) retrieves multiple I/O device groups, e.g., as persisted on the client computing device 100 or from a remote location where the I/O device groups are stored remotely. The retrieved I/O device groups include at least a first I/O device group associated with a first group of input or output (I/O) devices locally connected to a client computing device, and a second I/O device group associated with a second group of I/O devices locally connected to the client computing device. The retrieved I/O device groups may include any number of I/O device groups as maintained or retrieved by device grouping module 420.

In operation 620A, first and second instances of an application on the client computing device 100 are launched, one for each of the first and second I/O device groups. For example, boot module 427 may receive information about I/O device groups from device grouping module 429 and launch the multiple instances of the application accordingly (e.g., according to the number of I/O device groups received). For example, the received I/O device groups may include two I/O device groups and therefore first and second instances of the application may be launched as in process 600A. The launched application instances may be, for example, the MTCApp for FIG. 3A or desktop application of FIG. 3B. The launched application instances may be any other application that the subject technology uses for supporting multiple users on client computing device 100.

In operation 630A, the first instance of the application launched is associated with the first I/O device group. In operation 640A, the second instance of the application is associated with the second I/O device group. The two instances of the application may then be used by two simultaneous users to share a client computing device 100 as described in this disclosure.

In operation 650A, an input output (I/O) data manger is launched to facilitate data exchange between device groups and application instances. For example, the I/O data manager 425 may be launched by client computing device via boot module 427, e.g., upon a first user logging onto client computing device 100. The I/O data manager directs input received from one or more devices in the first I/O device group to the first instance of the application and directs input received from one or more devices in the second I/O device group to the second instance of the application. The I/O data manager also takes output received from the first instance of the application and directs it to one or more devices in the first I/O device group and takes output received from the second instance of the application and directs it to one or more devices in the second I/O device group. The I/O data manger may manage input from other I/O device groups and output to other I/O device groups, where more than two I/O device groups exist for the client computing device 100 and where more than two instances of the application have been launched for the I/O device groups. I/O data manager may maintain information about which process is associated with which I/O device group, for example, as that information is received from boot module 427 as discussed above.

Launching of the first instance of the application enables a first user of input or output devices in the first I/O device group and the second instance of the application enables a second user of input or output devices in the second I/O device group to simultaneously share the resources of the client computing device. If more than two instances of the application are launched, associated with more than two I/O device groups, then more than two users may be supported for sharing the client computing device simultaneously.

Figure 6B:
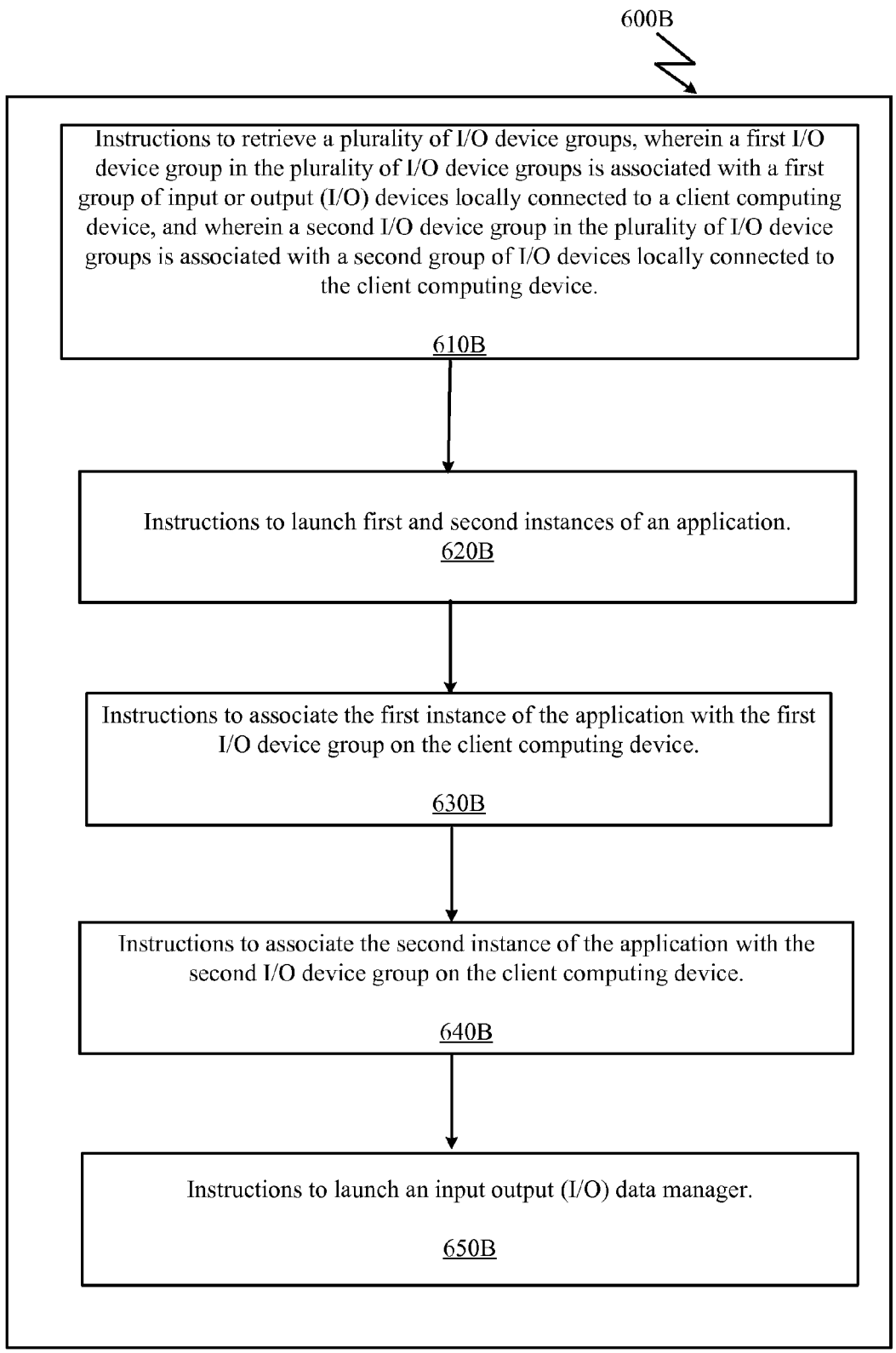
FIG. 6B is an example of a computer memory including instructions for operations of multiple users sharing a client computing device.

Example of Instructions for Operations of Multiple Users Sharing a Client Computing Device FIG. 6B is an example of a device 600B including instructions for operations of multiple users sharing a client computing device.

The device 600B may include instructions 610B to retrieve a plurality of I/O device groups, wherein a first I/O device group in the plurality of I/O device groups is associated with a first group of input or output (I/O) devices locally connected to a client computing device, and wherein a second I/O device group in the plurality of I/O device groups is associated with a second group of I/O devices locally connected to the client computing device.

The device 600B may include instructions 620B to launch first and second instances of an application.

The device 600B may include instructions 630B to associate the first instance of the application with the first I/O device group on the client computing device.

The device 600B may include instructions 640B to associate the second instance of the application with the second I/O device group on the client computing device.

The device 600B may include instructions 650B to launch an input output (I/O) data manager.

In one example, the device 600B comprises a machine-readable medium having software code stored thereon, and the software code includes the instructions described in FIG. 6B.

Figure 6C:
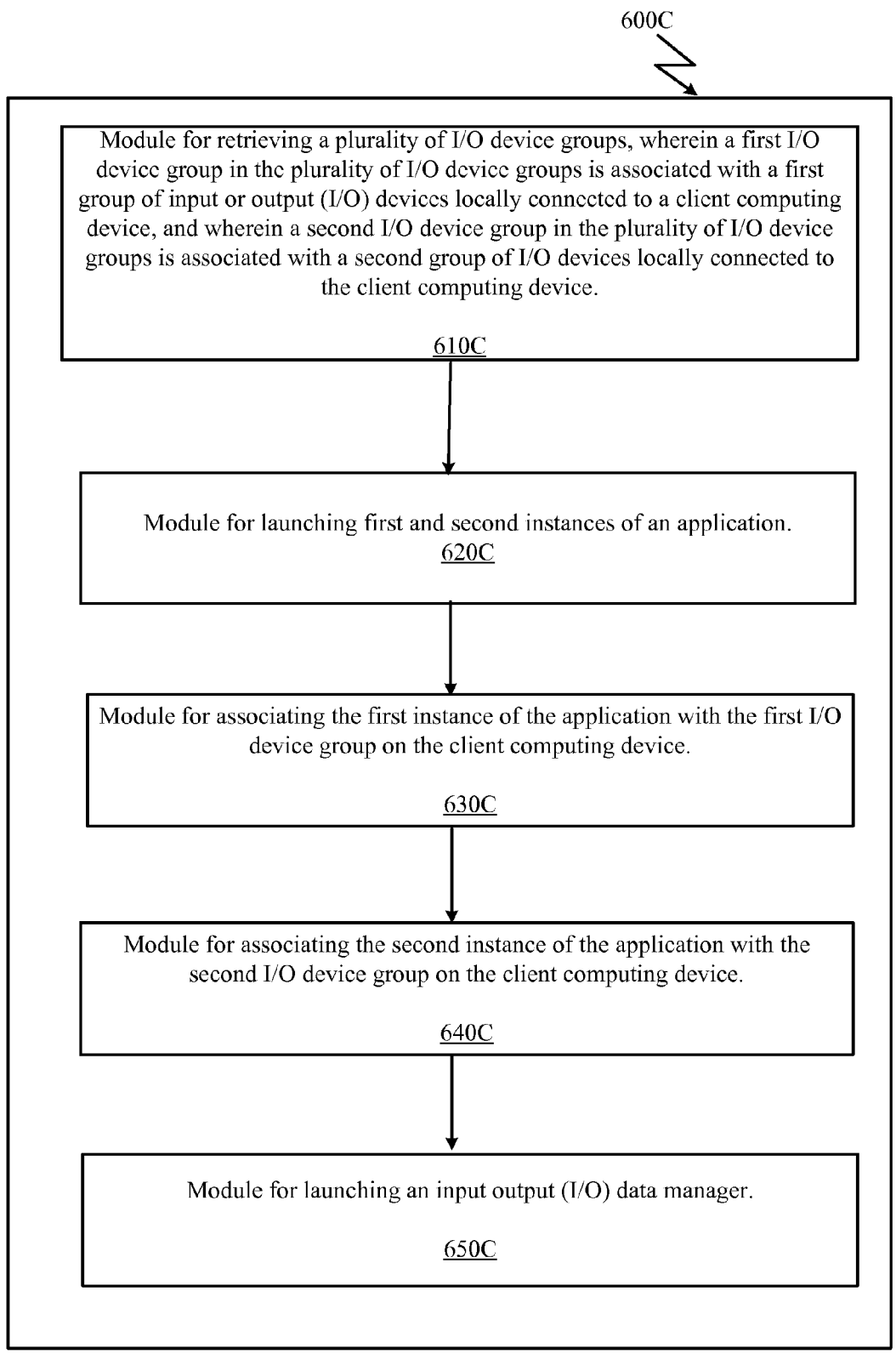
FIG. 6C is an example of a computer memory including one or more modules for operations for multiple users sharing a client computing device.

Example of One or More Modules for Operations of Multiple Users Sharing a Client Computing Device FIG. 6C is an example of a device 600C including one or more modules for operations for multiple users sharing a client computing device.

The device 600C may include a module 610C to retrieve a plurality of I/O device groups, wherein a first I/O device group in the plurality of I/O device groups is associated with a first group of input or output (I/O) devices locally connected to a client computing device, and wherein a second I/O device group in the plurality of I/O device groups is associated with a second group of I/O devices locally connected to the client computing device.

The device 600C may include a module 620C to launch first and second instances of an application.

The device 600C may include a module 630C to associate the first instance of the application with the first I/O device group on the client computing device.

The device 600C may include a module 640C to associate the second instance of the application with the second I/O device group on the client computing device.

The device 600C may include a module 650C to launch an input output (I/O) data manager.

In one example, the device 600C comprises a computer memory, and each of the modules (e.g., 610C, 620C, 630C, 640C, 650C) comprises software code that can perform its respective action/function as described. In one example, the device 600C comprises circuits and/or logic, and each of the modules (e.g., 610C, 620C, 630C, 640C, 650C) comprises circuit component(s) or logic component(s) that can perform its respective action/function as described.

Figure 7:
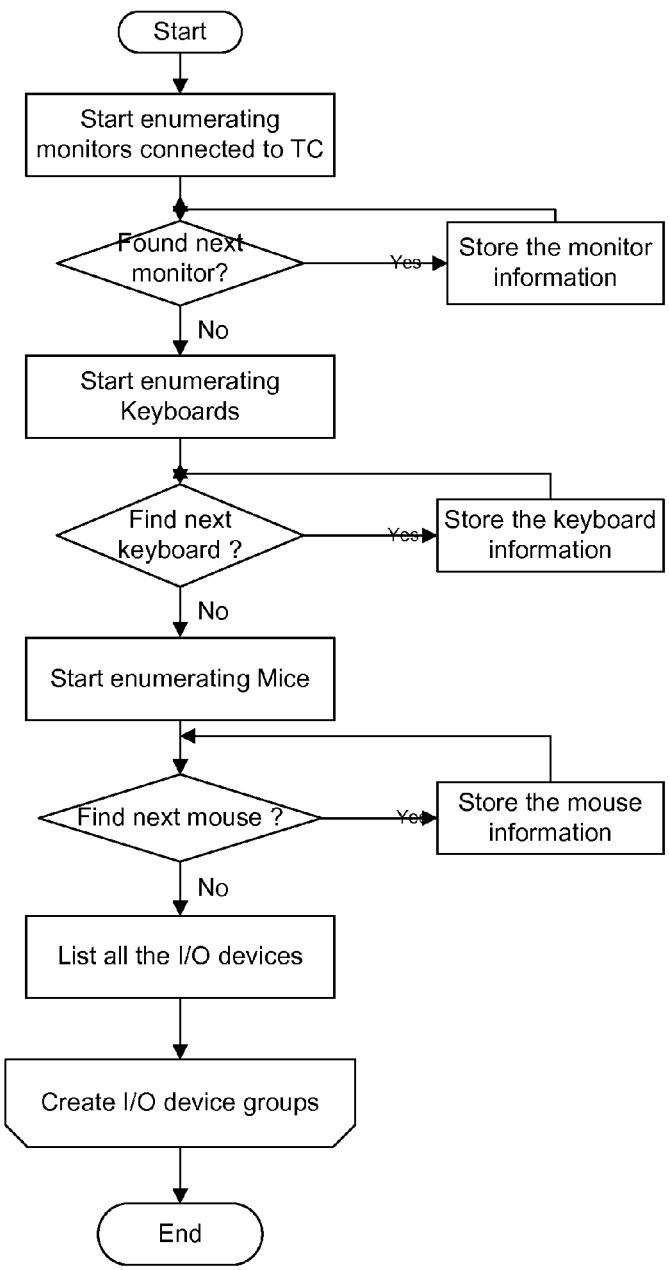
FIG. 7 is a flow chart illustrating an example of a process for grouping input output devices for multiple users sharing one client computing device.

Example Flowchart of a Configuration Application for Multiple Users Sharing a Client Computing Device FIG. 7 is a conceptual block diagram illustrating an example of a configuration application for multiple users sharing a client computing device 100. For example, the admin module 431 may be implemented as an applet application, allowing a user of the client computing device or an admin user to configure device I/O groups.

FIG. 7 shows the process for administration of I/O device groups starts with enumerating through monitors connected to a thin client (or TC). Then the process checks to see if a next monitor is found. If yes, then information about the found monitor is stored.

If not, then the process continues with enumerating through keyboards connected to the thin client. Then the process checks to see if a next keyboard is found. If yes, then information about the found keyboard is stored. If not, then the process continues with enumerating through mice connected to the thin client.

Then the process checks to see if a next mouse is found. If yes, then information about the found mouse is stored. If not, then the process continues by listing all of the input and output devices found on the thin client. After the listing of I/O devices, I/O device groups are created. For example, a user may select I/O devices from the list to create various I/O device groups for multi-user sharing of a client computing device 100. Each I/O device group may include multiple I/O devices found on the thin client.

Example Flowchart of a Client Computing Device Boot Process.

Figure 8:
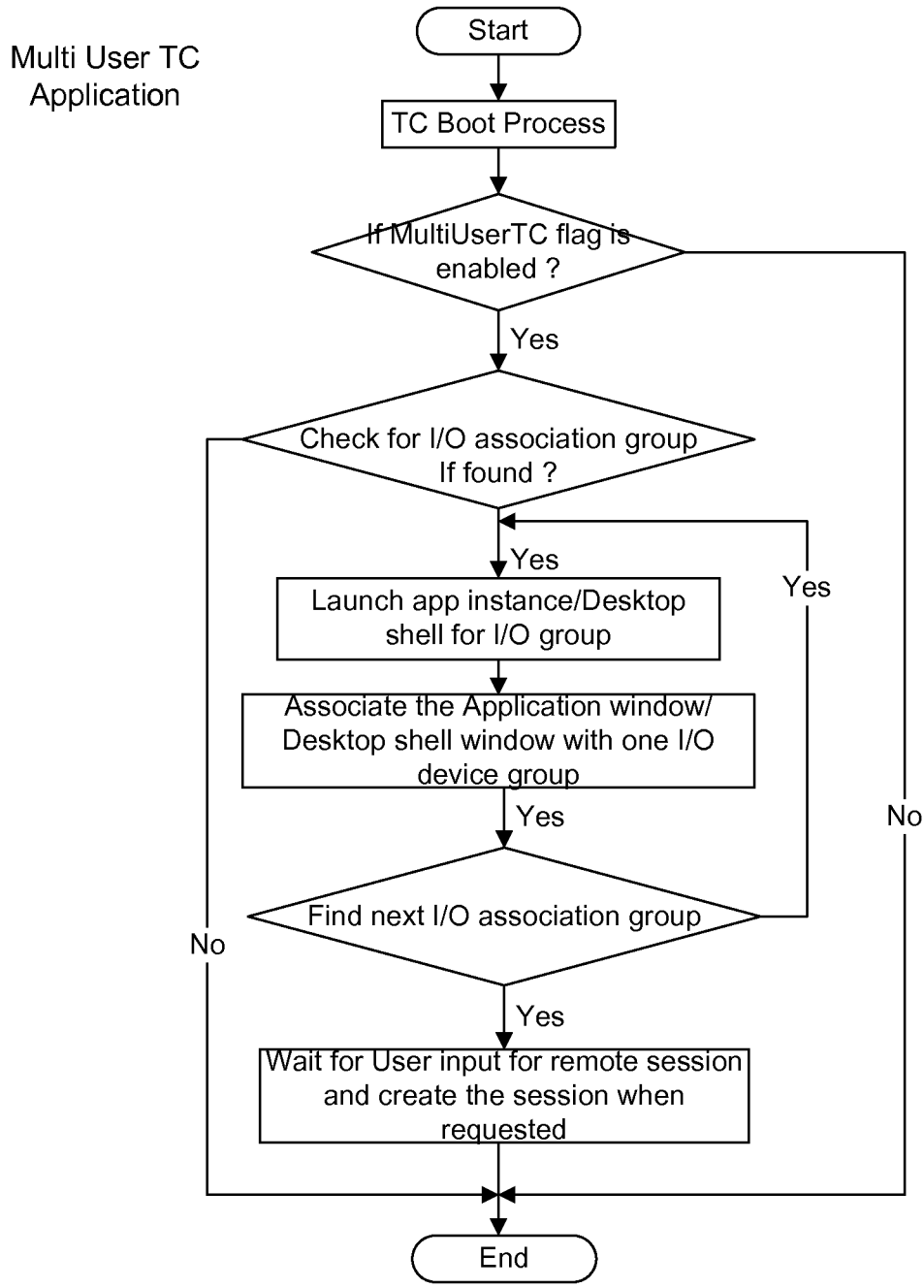
FIG. 8 is a flow chart illustrating an example of a process for multiple users sharing one client computing device.

FIG. 8 is a conceptual block diagram illustrating an example of a client computing device 100 and its boot process, e.g., boot module 427. The process starts with the thin client (or TC) boot process starting, for example, when the TC is powered on. After the boot process starts, a check is made to see if a "MultiUserTC flag" is enabled. If not, then the TC will start up in a single user mode for use by a single user.

If yes, then a check for an I/O associated group is made. If an I/O device group is found, then an application instance (e.g., MTCApp or desktop application instance) is launched. The launched instance of the application is then associated with the found I/O device group. Then the process checks to see if another I/O device group exists. If yes, then another instance of the application is launched, associated with the next I/O device group, and a check for another I/O device group is performed. This process may be repeated for each I/O device group on the client computing device to launch one instance of the application per I/O device group.

The process then waits for input from a user. If the user inputs, e.g., a request for a remote session, then a remote session is created, associated with the I/O device group from which that request is initiated. For example, the I/O data manager 425 may handle such remote session requests. The remote session may be established by an instance of an application (e.g., MTCApp) associated with the I/O device group from which the user initiated the request.

Example of Computing Device

Figure 9:
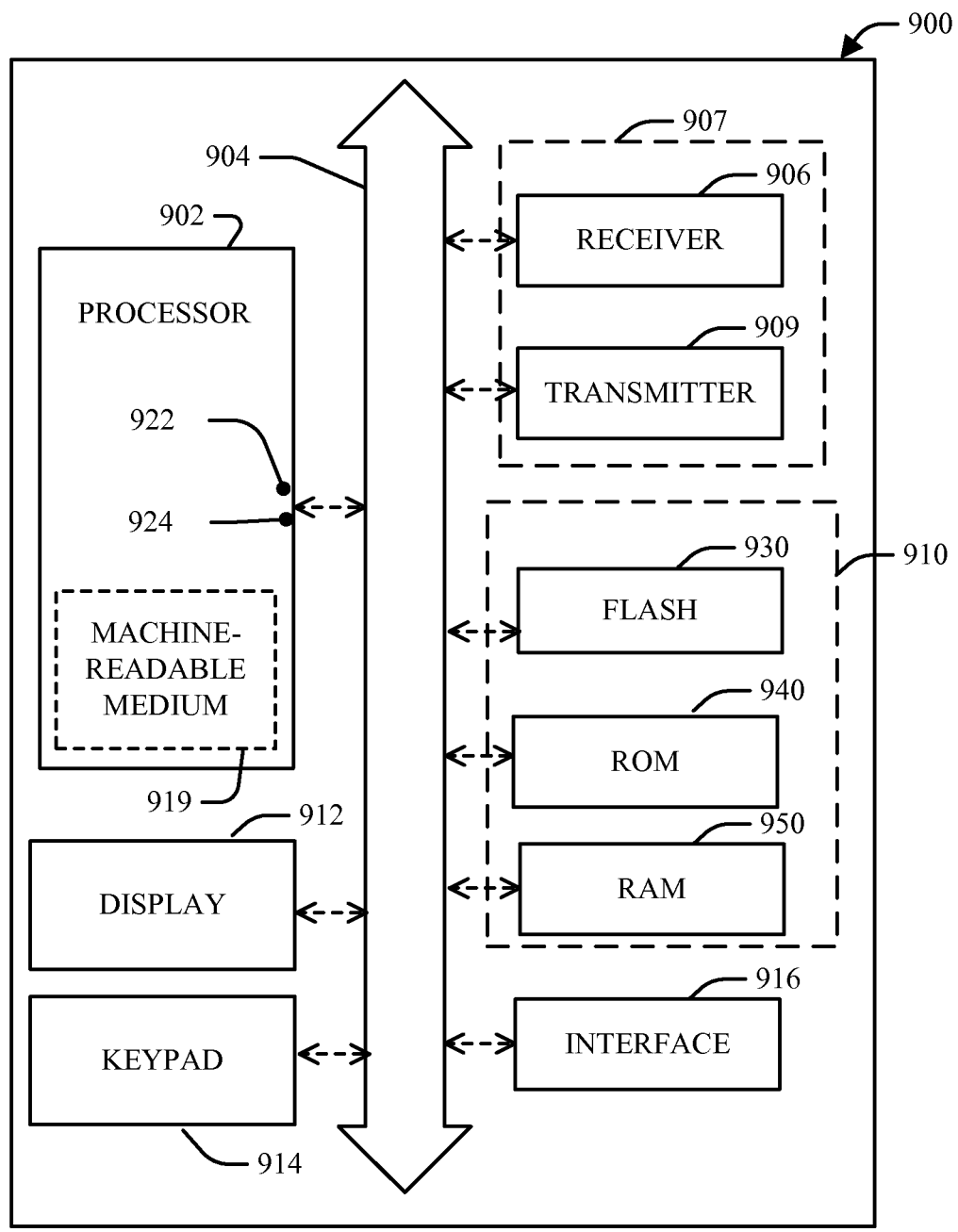
FIG. 9 is a conceptual block diagram illustrating an example of a computing device.

FIG. 9 is a conceptual block diagram illustrating an example of a computing device.

A computing device 900 may be, for example, a client computing device 100 or 120, or a thin client 210, 220 or 230, or server 250. A computing device may comprise one or more computing devices.

A computing device 900 may include a processor 902. A processor 902 can be one or more processors. The processor 902 is capable of communication with a receiver 906 and a transmitter 908 through a bus 904 or other structures or devices. It should be understood that communication means other than busses can be utilized with the disclosed configurations. The processor 902 can generate commands, messages, and/or other types of data to be provided to the transmitter 909 for communication. In addition, commands, messages, and/or other types of data can be received at the receiver 906, and processed by the processor 902.

The processor 902 may operate in conjunction with a general-purpose processor or a specific-purpose processor for executing instructions and may further include a machine-readable medium 919 for storing data and/or instructions for software programs. The instructions, which may be stored in a machine-readable medium 910 and/or 919, are executable by the processor 902 to control and manage access to the various networks, as well as provide other communication and processing functions. The instructions may also include instructions executable by the processor 902 for various user interface devices, such as a display 912 and a keypad 914. The processor 902 may include an input port 922 and an output port 924. Each of the input port 922 and the output port 924 may include one or more ports. The input port 922 and the output port 924 may be the same port (e.g., a bi-directional port) or may be different ports.

The processor 902 may be implemented using software, hardware, or a combination of both. By way of example, the processor 902 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information. Those skilled in the art will recognize how best to implement the described functionality for the processing system 902.

Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code). Instructions may be executable, for example, by a computing device (e.g., a client computing device, an HTTP server, a web server) or by a processing system (e.g., an operating system, an HTTP server, or a web server). Instructions can be, for example, a computer program including code.

A machine-readable medium can be one or more machine-readable media. A machine-readable medium (e.g., 910) may include storage external to an operating system, such as a random access memory (RAM) 950, a flash memory 930, a read only memory (ROM) 940, a programmable read-only memory (PROM), an erasable PROM (EPROM), registers, a hard disk, a removable disk, a CD-ROM, a DVD, or any other suitable storage device. A machine-readable medium 919 may also have a volatile memory and a non-volatile memory. The machine-readable medium 919 may be a non-transitory machine-readable medium. A non-transitory machine-readable medium may include one or more volatile and/or non-volatile memories. A machine-readable medium 919 may include storage integrated into a processing system, such as might be the case with an application specific integrated circuit (ASIC). A memory may be a machine-readable medium (e.g., 910 or 919) or a part thereof.

According to one aspect of the disclosure, a machine-readable medium is a computer-readable medium encoded or stored with instructions and is a computing element, which defines structural and functional interrelationships between the instructions and the rest of the computing device, which permit the instructions' functionality to be realized. In one aspect, a machine-readable medium is a non-transitory machine-readable medium, a machine-readable storage medium, or a non-transitory machine-readable storage medium. In one aspect, a machine-readable medium is a computer-readable medium, a non-transitory computer-readable medium, a computer-readable storage medium, or a non-transitory computer-readable storage medium.

An interface 916 may be any type of interface and may reside between any of the components shown in FIG. 9. An interface 916 may also be, for example, an interface to the outside world (e.g., an Internet network interface). A transceiver block 907 may represent one or more transceivers, and each transceiver may include a receiver 906 and a transmitter 909. A functionality implemented in a processing system 902 may be implemented in a portion of a receiver 906, a portion of a transmitter 909, a portion of a machine-readable medium 910, a portion of a display 912, a portion of a keypad 914, or a portion of an interface 916, and vice versa. In one aspect, a computing device may include only some or all of the elements shown in FIG. 9. A computing device may include other elements not shown in FIG. 9. A computing device may include more than one of the same elements.

Example of Network System

Figure 10:
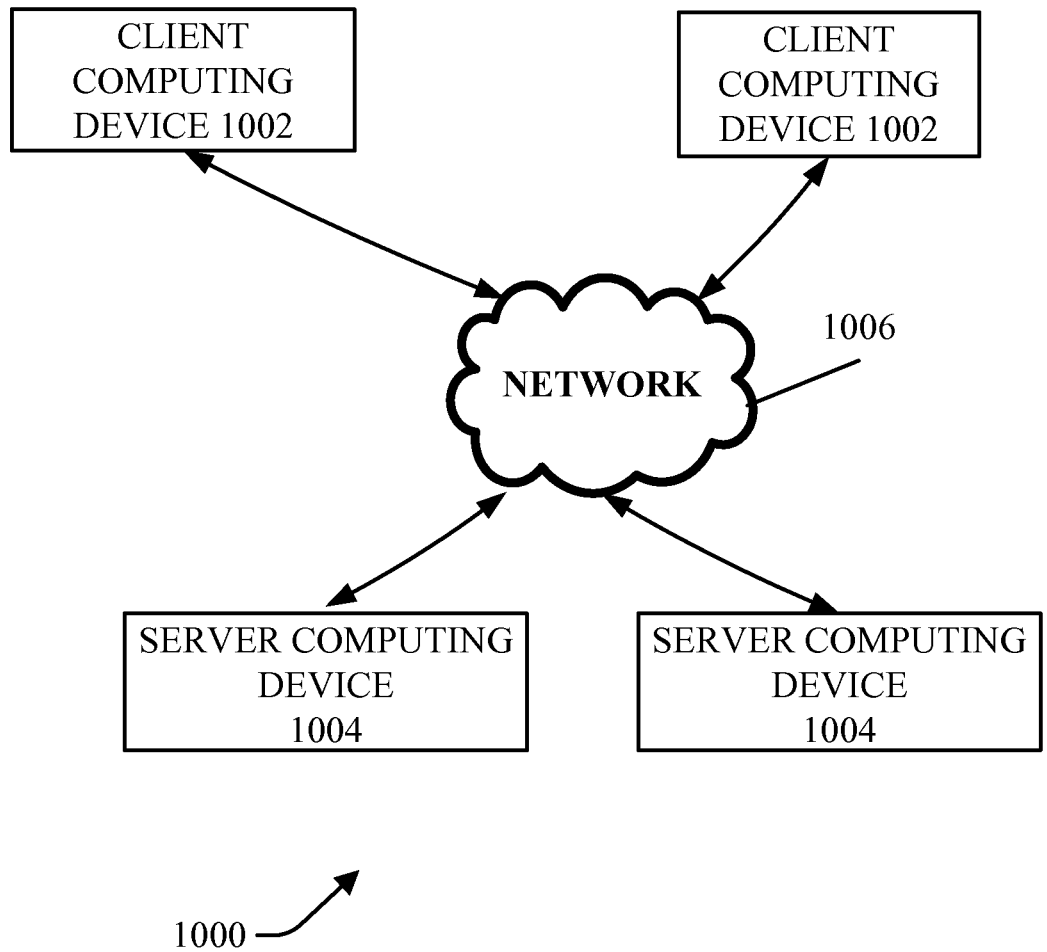
FIG. 10 illustrates a simplified diagram of an example of a network system.

FIG. 10 illustrates a simplified diagram of an example of a computer network system in accordance with an aspect of the present disclosure.

A computer network system 1000 may include one or more client computing devices 1002 (e.g., laptop computers, desktop computers, tablets, PDAs, mobile phones, etc.) in communication with one or more server computing devices 1004 (e.g., a server such as an HTTP server, a web server, an enterprise server, etc.) via a network 1006. In one aspect, a server computing device 1004 is configured to allow remote sessions (e.g., remote desktop sessions) wherein users can access applications and files on the server computing device 1004 by logging onto the server computing device 1004 from a client computing device 1002. Such a connection may be established using any of several well-known techniques such as the remote desktop protocol (RDP) on a Windows-based server or the techniques disclosed herein for a non-Windows-based server.

In one aspect of the disclosure, a client computing device 1002 may be an end-user computing device, such as a laptop or desktop computer. In one aspect, a server computing device 1004 may be a terminal services gateway (TSGW) server or a remote desktop gateway (RDGW) server.

By way of illustration and not limitation, a client computing device 1002 can represent a computer, a mobile phone, a laptop computer, a tablet, a thin computing device, a personal digital assistant (PDA), a portable computing device, a virtual machine, or a suitable device with a processor. In one example, a client computing device 1002 is a smart phone (e.g., iPhone, Android phone, Blackberry, etc.). In certain configurations, a client computing device 1002 can represent an audio player, a game console, a camera, a camcorder, an audio device, a video device, a multimedia device, or a device capable of supporting a connection to a remote computing device. In an advantageous example, a client computing device 1002 is mobile. In another advantageous example, a client computing device 1002 is a hand-held device. In another example, a client computing device 1002 can be stationary. In one example, a client computing device 1002 may be a device having at least a processor and memory, where the total amount of memory of the client computing device 1002 is less than the total amount of memory in a server computing device 1004. In an advantageous example, a client computing device 1002 does not have a hard disk. In one advantageous aspect, a client computing device 1002 has a display smaller than a display supported by a server computing device 1004.

In one aspect, a server computing device 1004 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a server computing device 1004 can be stationary. In another aspect, a server computing device 1004 can be mobile. In certain configurations, a server computing device 1004 may be any device that can represent a computing device. In one aspect, a server computing device 1004 may include one or more computing devices.

In one example, a first device is remote to a second device when the first device is not directly connected to the second device. In one example, a first remote device may be connected to a second device over a communication network such as a Local Area Network (LAN), a Wide Area Network (WAN), and/or other network.

When a client computing device 1002 and a server computing device 1004 are remote with respect to each other, a client computing device 1002 may connect to a server computing device 1004 over a network 1006, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 1006 can be a LAN network, a WAN network, a wireless network, the Internet, an intranet or other network. A remote device (e.g., a computing device) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. However, the subject technology is not limited to these examples.

Example of a Client Computing Device 100

Figure 11:
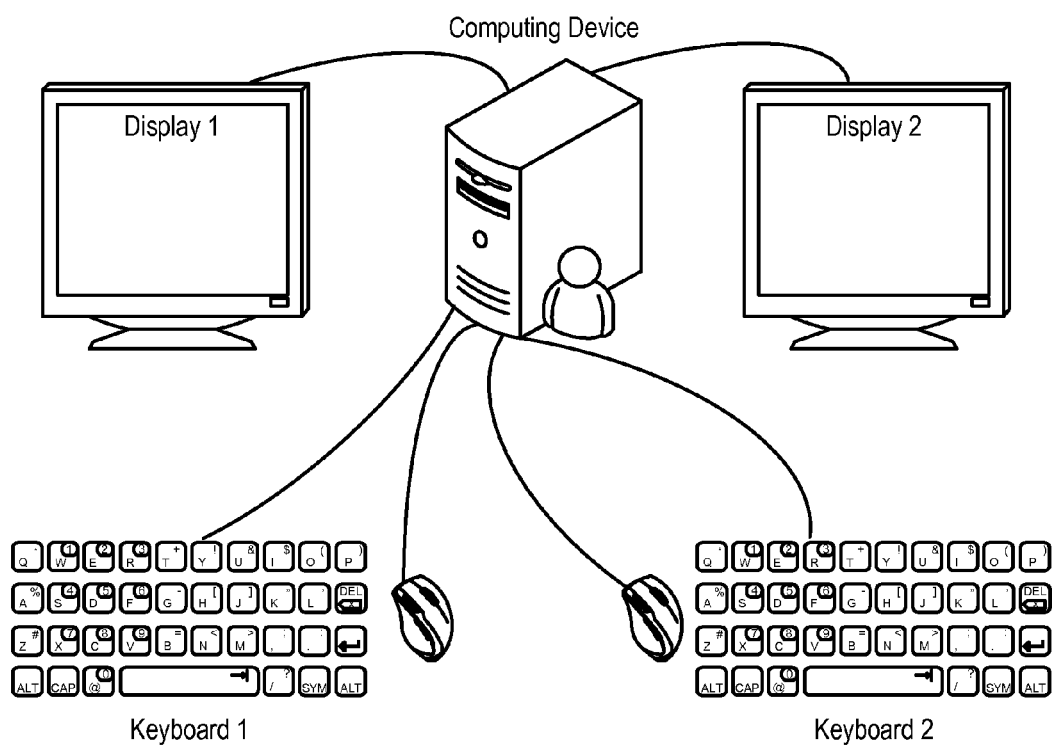
FIG. 11 illustrates a client computing device configuration.

FIG. 11 illustrates a example of a client computing device configuration. In this example, a computing device is connected to two displays, display1 and display2, to two keyboards, keyboard1 and keyboard 2, and to two mice. FIG. 11 illustrates a client computing device with two groups of I/O devices for sharing with two simultaneous users, as discussed above.

Example of I/O Device Groups

Figure 12:
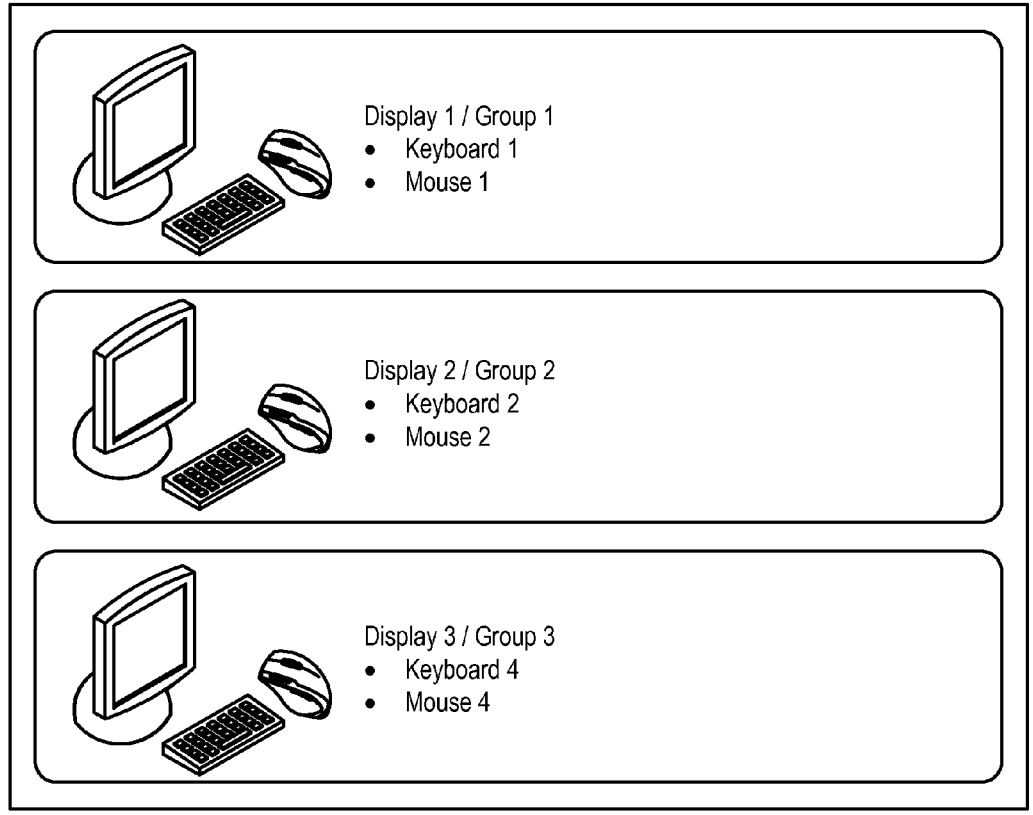
FIG. 12 illustrates I/O device groups.

FIG. 12 illustrates one example of I/O device groups of the subject disclosure. In one aspect, the display in FIG. 12 may be presented by an admin application (see admin module described for FIG. 4 above). Such an admin application may be used to configure I/O device groups as discussed above. FIG. 12 shows an example grouping of three I/O device groups, Group 1, Group 2, and Group 3. Each I/O device group, is shown to include one display, one keyboard and one mouse each respectively. As such, Group 1 includes a display 1, a keyboard 1, and a mouse 1. Group 2 includes a display 2, a keyboard 2, and a mouse 2. Group 3 includes a display 3, a keyboard 4, and a mouse 4.

Example of a Client Computing Device 100

Figure 13:
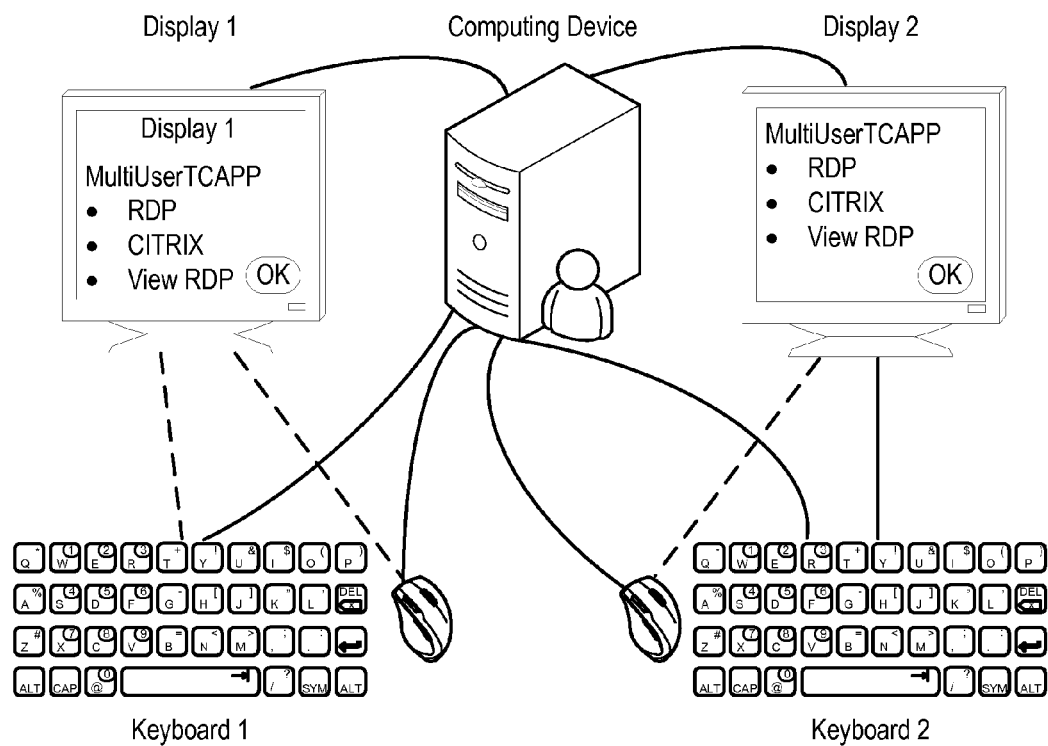
FIG. 13 illustrates a client computing device with multiple instances of a multi-user thin client application.

FIG. 13 illustrates a client computing device with multiple instances of a multi-user thin client application. As discussed above, multiple users may share one client computing device by, e.g., launching multiple instances of either a remote connection manager application or multi-user thin client application (MTCApp as discussed for FIG. 3A) or multiple instances of a desktop application (as discussed for FIG. 3B). FIG. 13 illustrates an example of display output for two instances of a remote connection manager application (referred to as MultiUserTCApp) shown on display 1 and display 2 for two users to simultaneously share the computing device. Display 1 shows the display output for a first instance of the MultiUserTCApp and display 2 shows the display output for a second instance of the MultiUserTCApp. As depicted the MultiUserTCApp provides the capability for a user to establish an RDP, Citrix®, or VMView session. FIG. 13 depicts that each display, display 1 and display 2, shows the display output of its own instance of the MultiUserTCApp. In FIG. 13, the dashed lines show that display 1 is associated with keyboard 1 and a mouse in a first I/O device group and the display 2 is associated with keyboard 2 and another mouse in a second I/O device group. These input devices may be used by the two independent users to launch remote sessions.

Example of a Client Computing Device 100

Figure 14:
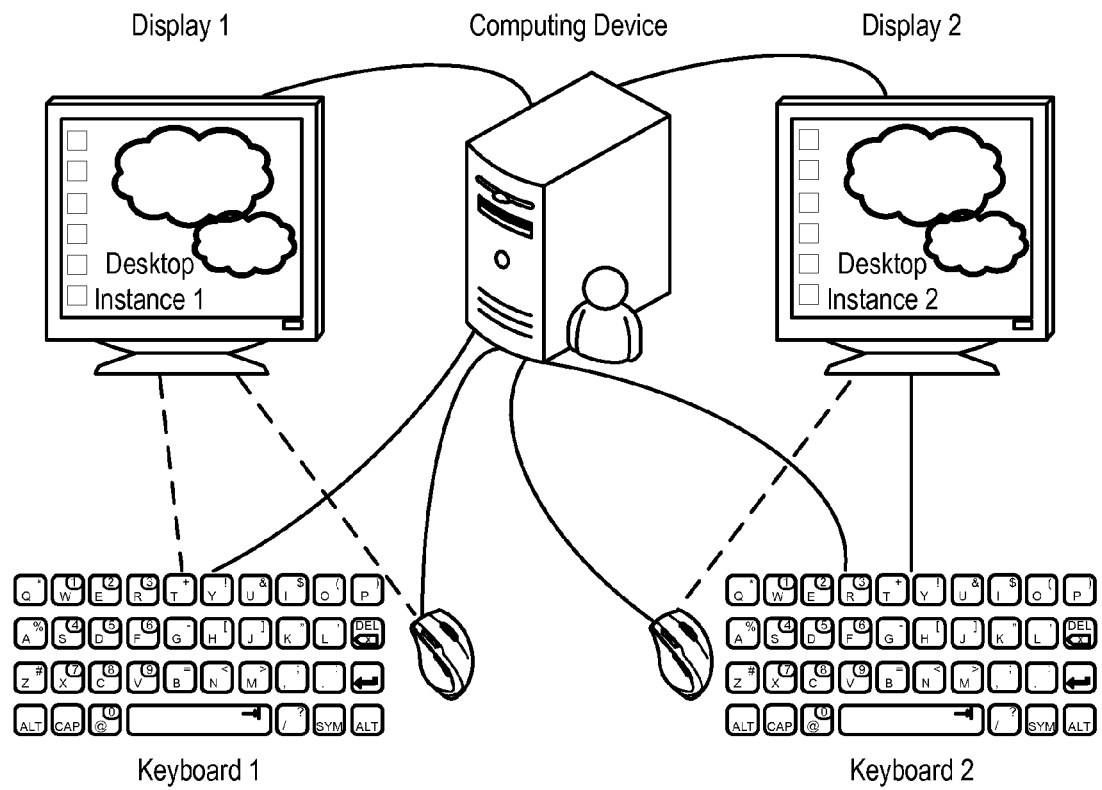
FIG. 14 illustrates a client computing device with multiple instances of a desktop application.

FIG. 14 illustrates a client computing device with multiple instances of a desktop application. As discussed above, multiple users may share one client computing device by, e.g., launching multiple instances of either a remote connection manager application or multi-user thin client application (MTCApp as discussed for FIG. 3A) or multiple instances of a desktop application (as discussed for FIG. 3B). FIG. 14 illustrates an example of display output for two instances of a desktop application shown on display 1 and display 2 for two users to simultaneously share the computing device. FIG. 14 depicts that each display, display 1 and display 2, shows the display output of its own instance of the desktop and that each desktop has multiple icons to facilitate access to the multiple applications for the respective user. In FIG. 13, the dashed lines show that display 1 is associated with keyboard 1 and a mouse in a first I/O device group and the that display 2 is associated with keyboard 2 and another mouse in a second I/O device group. These input devices may be used by the two independent users to launch the various applications provided by the desktop instances.

Example of Components of a Client Computing Device

Figure 15:
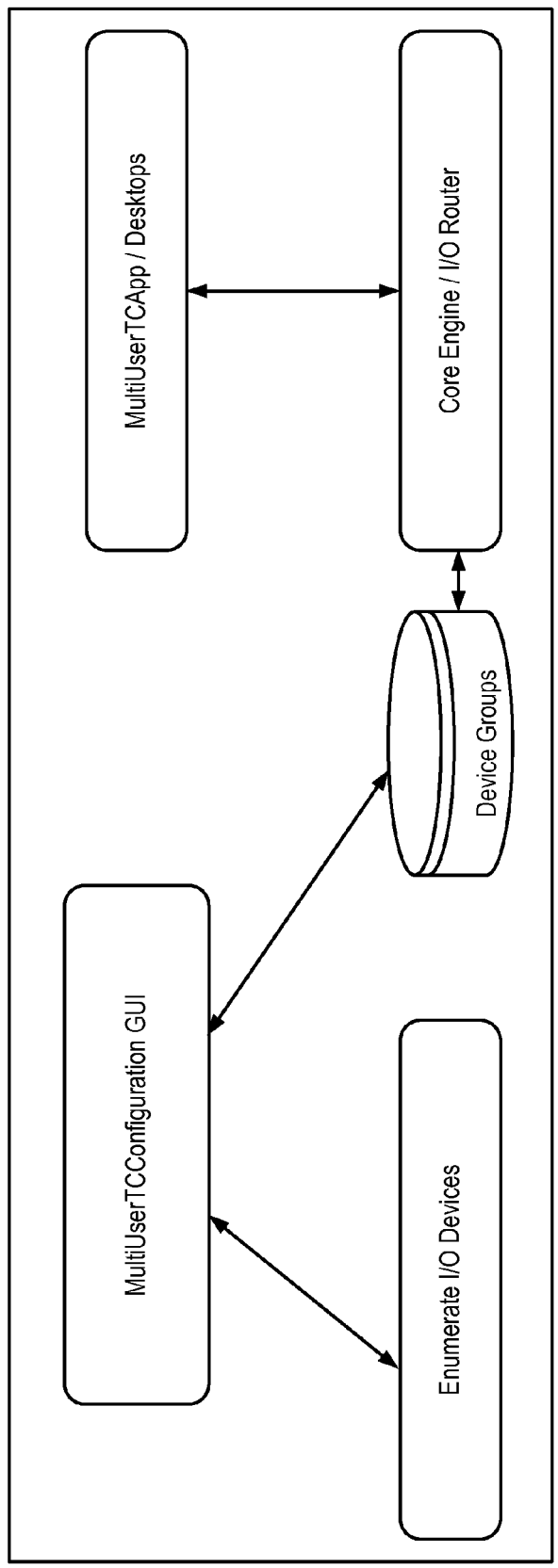
FIG. 15 illustrates an example of a client computing device in accordance with one aspect of this disclosure.

FIG. 15 illustrates an example of a client computing device in accordance with one aspect of this disclosure. FIG. 15 shows a MultiUserTCConfiguration GUI display, which may display a visual representation of the I/O device groups on the computing device including the individual devices in each group (as discussed above for admin module for FIG. 4). In one aspect, the MultiUserTCCconfiguration GUI may list the I/O devices enumerated on the computing device and allow a user (e.g., admin user) to group the enumerated I/O devices into groups.

The MultiUserTCCConfiguration GUI is communicatively coupled to an Enumerate I/O devices module and a Device groups database. The Enumerate I/O devices module may enumerate through devices available to a computing device and make them available to an administration application such as MultiUserTCConfiguration GUI for a user to group I/O devices (as discussed in FIG. 4). Also, the Device groups database may persistently store information about which I/O devices belong to which group.

FIG. 15 also depicts a core engine I/O router that is communicatively coupled to the device groups database and application instances of either MultiUserTCApp or a Desktop. The core engine I/O router is discussed in more detail above with reference to FIG. 4. It may retrieve information about device groups from the device groups database as shown in FIG. 15. The Core engine I/O router may also communicate with instances of the MultiUserTCApp or Desktop application to route input traffic to these instances based on what device group the input is received from and to route output traffic from these instances to device groups based on the mapping of these instances to I/O device groups, as provided by the information from the device groups database (as discussed for FIG. 4).

Illustration of Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

1. A computer-implemented method enabling multiple users to simultaneously share a client computing device, the method comprising:

facilitating detecting of a plurality of input or output (I/O) devices connected to a client computing device; and facilitating assigning of the detected plurality of I/O devices to a plurality of I/O device groups, wherein each I/O device group comprises of one or more of the detected plurality of I/O devices, wherein the plurality of I/O device groups facilitate the client computing device to be simultaneously shared by multiple users of the client computing machine.

2. The method of clause 1, further comprising:

facilitating storing of the plurality of I/O device groups on the client computing device.

3. The method of clause 1, wherein the assigning of the detected plurality of I/O devices to the plurality of I/O device groups is based on input received from an administrator user of the client computing device.

4. The method of clause 1, wherein the assigning of the detected plurality of I/O devices to the plurality of I/O device groups is based on an order of enumeration of the detected plurality of I/O devices.

5. The method of clause 1, wherein the detected I/O devices are connected to the client computing device locally.

6. The method of clause 1, wherein each group in the plurality of I/O device groups comprises a monitor and at least one of a pointing input device and a keyboard from the detected plurality of I/O devices.

7. The method of clause 1, further comprising:
facilitating launching of multiple instances of an application, wherein each instance of the application is associated with a respective I/O device group in the plurality of I/O device groups.

8. The method of clause 7, further comprising:
facilitating launching an I/O data manager, wherein the I/O data manager directs input received from one or more devices from a I/O device group in the plurality of I/O device groups to the instance of the application associated with said I/O device group, and wherein the I/O data manager directs output received from the instance of the application associated with said I/O device group to one or more devices in said I/O device group.

9. The method of clause 7, wherein the facilitating of launching of multiple instances of an application is done upon the client computing device booting up.

10. The method of clause 7, wherein the facilitating of launching of multiple instances of an application is done upon a first user of the client computing device logging onto the client computing device.

11. The method of clause 10, wherein the first user logs onto the client computing device using a Windows system login.

12. The method of clause 10, wherein the first user logs onto the client computing device using a Linux system login.

13. The method of clause 7, wherein the application is a desktop shell application.

14. The method of clause 7, wherein the application is a remote connection manager application.

15. The method of clause 7, wherein facilitating of the launching multiple instances of the application comprises launching, for each instance of the application, a custom login screen for the application on an output device in the respective I/O device group in the plurality of I/O device groups.

16. The method of clause 7, wherein each instance of the application in the multiple instances of the application is associated with a respective remote session, wherein the remote session enables the instance of the application to exchange data with a server using the remote session.

17. The method of clause 16, wherein the respective remote sessions are RDP sessions.

18. The method of clause 16, wherein the respective remote sessions are ICA sessions.

19. A non-transitory machine-readable medium comprising instructions stored therein, the instructions executable by one or more processors to perform one or more operations, the instructions comprising:
code for causing the one or more processors to facilitate detecting of a plurality of input or output (I/O) devices connected to a client computing device; and
code for causing the one or more processors to facilitate assigning of the detected plurality of I/O devices to a plurality of I/O device groups, wherein each I/O device group comprises of one or more of the detected plurality of I/O devices, wherein the plurality of I/O device groups facilitate the client computing device to be simultaneously shared by multiple users of the client computing machine.

20. The non-transitory machine-readable medium of clause 19, further comprising:
code for causing the one or more processors to facilitate storing of the plurality of I/O device groups on the client computing device.

21. The non-transitory machine-readable medium of clause 19, wherein the assigning of the detected plurality of I/O devices to the plurality of I/O device groups is based on input received from an administrator user of the client computing device.

22. The non-transitory machine-readable medium of clause 19, wherein the assigning of the detected plurality of I/O devices to the plurality of I/O device groups is based on an order of enumeration of the detected plurality of I/O devices.

23. The non-transitory machine-readable medium of clause 19, wherein the detected I/O devices are connected to the client computing device locally.

24. The non-transitory machine-readable medium of clause 19, wherein each group in the plurality of I/O device groups comprises a monitor and at least one of a pointing input device and a keyboard from the detected plurality of I/O devices.

25. The non-transitory machine-readable medium of clause 19, further comprising:
code for causing the one or more processors to facilitate launching of multiple instances of an application, wherein each instance of the application is associated with a respective I/O device group in the plurality of I/O device groups.

26. The method of clause 25, further comprising:
code for causing the one or more processors to facilitate launching an I/O data manager, wherein the I/O data manager directs input received from one or more devices from a I/O device group in the plurality of I/O device groups to the instance of the application associated with said I/O device group, and wherein the I/O data manager directs output received from the instance of the application associated with said I/O device group to one or more devices in said I/O device group.

27. The non-transitory machine-readable medium of clause 25, wherein the facilitating of launching of multiple instances of an application is done upon the client computing device booting up.

28. The non-transitory machine-readable medium of clause 25, wherein the facilitating of launching of multiple instances of an application is done upon a first user of the client computing device logging onto the client computing device.

29. The non-transitory machine-readable medium of clause 28, wherein the first user logs onto the client computing device using a Windows system login.

30. The non-transitory machine-readable medium of clause 28, wherein the first user logs onto the client computing device using a Linux system login.

31. The non-transitory machine-readable medium of clause 25, wherein the application is a desktop shell application.

32. The non-transitory machine-readable medium of clause 25, wherein the application is a remote connection manager application.

33. The non-transitory machine-readable medium of clause 25, wherein facilitating of the launching multiple instances of the application comprises launching, for each instance of the application, a custom login screen for the application on an output device in the respective I/O device group in the plurality of I/O device groups.

34. The non-transitory machine-readable medium of clause 25, wherein each instance of the application in the multiple instances of the application is associated with a respective remote session, wherein the remote session enables the instance of the application to exchange data with a server using the remote session.

35. The non-transitory machine-readable medium of clause 34, wherein the respective remote sessions are RDP sessions.

36. The non-transitory machine-readable medium of clause 34, wherein the respective remote sessions are ICA sessions.

37. An apparatus, comprising:
one or more modules configured to facilitate detecting of a plurality of input or output (I/O) devices connected to a client computing device; and
one or more modules configured to facilitate assigning of the detected plurality of I/O devices to a plurality of I/O device groups, wherein each I/O device group comprises of one or more of the detected plurality of I/O devices, wherein the plurality of I/O device groups facilitate the client computing device to be simultaneously shared by multiple users of the client computing machine.

38. The apparatus of clause 37, further comprising:
one or more modules configured to facilitate storing of the plurality of I/O device groups on the client computing device.

39. The apparatus of clause 37, wherein the assigning of the detected plurality of I/O devices to the plurality of I/O device groups is based on input received from an administrator user of the client computing device.

40. The apparatus of clause 37, wherein the assigning of the detected plurality of I/O devices to the plurality of I/O device groups is based on an order of enumeration of the detected plurality of I/O devices.

41. The apparatus of clause 37, wherein the detected I/O devices are connected to the client computing device locally.

42. The apparatus of clause 37, wherein each group in the plurality of I/O device groups comprises a monitor and at least one of a pointing input device and a keyboard from the detected plurality of I/O devices.

43. The apparatus of clause 37, further comprising:
one or more modules configured to facilitate launching of multiple instances of an application, wherein each instance of the application is associated with a respective I/O device group in the plurality of I/O device groups.

44. The apparatus of clause 43, further comprising:
one or more modules to facilitate launching an I/O data manager, wherein the I/O data manager directs input received from one or more devices from a I/O device group in the plurality of I/O device groups to the instance of the application associated with said I/O device group, and wherein the I/O data manager directs output received from the instance of the application associated with said I/O device group to one or more devices in said I/O device group.

45. The apparatus of clause 43, wherein the facilitating of launching of multiple instances of an application is done upon the client computing device booting up.

46. The apparatus of clause 43, wherein the facilitating of launching of multiple instances of an application is done upon a first user of the client computing device logging onto the client computing device.

47. The apparatus of clause 46, wherein the first user logs onto the client computing device using a Windows system login.

48. The apparatus of clause 46, wherein the first user logs onto the client computing device using a Linux system login.

49. The apparatus of clause 43, wherein the application is a desktop shell application.

50. The apparatus of clause 43, wherein the application is a remote connection manager application.

51. The apparatus of clause 43, wherein facilitating of the launching multiple instances of the application comprises launching, for each instance of the application, a custom login screen for the application on an output device in the respective I/O device group in the plurality of I/O device groups.

52. The apparatus of clause 43, wherein each instance of the application in the multiple instances of the application is associated with a respective remote session, wherein the remote session enables the instance of the application to exchange data with a server using the remote session.

53. The apparatus of clause 52, wherein the respective remote sessions are RDP sessions.

54. The apparatus of clause 52, wherein the respective remote sessions are ICA sessions.

55. A computer-implemented method for multiple users simultaneously sharing a client computing device, the method comprising:
retrieving a plurality of I/O device groups, wherein a first I/O device group in the plurality of I/O device groups is associated with a first group of input or output (IO) devices locally connected to a client computing device, and wherein a second I/O device group in the plurality of I/O device groups is associated with a second group of I/O devices locally connected to the client computing device;
launching first and second instances of an application;
associating the first instance of the application with the first I/O device group on the client computing device; and
associating the second instance of the application with the second I/O device group on the client computing device.

56. The method of clause 55, further comprising:
launching an I/O data manager, wherein the I/O data manager directs input received from one or more devices in the first I/O device group to the first instance of the application and directs input received from one or more devices in the second I/O device group to the second instance of the application, and wherein the I/O data manager directs output received from the first instance of the application to one or more devices in the first I/O device group and directs output received from the second instance of the application to one or more devices in the second I/O device group.

57. The method of clause 55, wherein the first instance of the application enables a first user of the first I/O device group and the second instance of the application enables a second user of the second I/O device group to simultaneously share the resources of the client computing device.

58. The method of clause 55, wherein the plurality of I/O device groups are retrieved from a storage on the client computing device.

59. The method of clause 55, wherein both the first I/O device group and the second I/O device group comprises a monitor and at least one of a pointing device and a keyboard each.

60. The method of clause 55, wherein the launching of the first and second instances of the application is done upon the client computing device booting up.

61. The method of clause 55, wherein the launching of the first and second instances of the application is done upon a first user of the client computing device logging onto the client computing device.

62. The method of clause 61, wherein the first user logs onto the client computing device using a Windows system login.

63. The method of clause 61, wherein the first user logs onto the client computing device using a Linux system login.

64. The method of clause 55, wherein the application is a desktop shell application.

65. The method of clause 55, wherein the application is a remote connection manager application.

66. The method of clause 55, wherein the launching of the first and second instances of the application comprises launching, for each of the first and second instances of the application, a custom login screen for the application on an output device in the respective I/O device group.

67. The method of clause 55, further comprising:
receiving input for creating a first remote session from a first user using the first instance of the application, wherein the first remote session is a connection with a server for communicating data between the server and the client computing device for the first user;
launching the first remote session based on the receiving of the input for creating the first remote session from the first user;
receiving input for creating a second remote session from a second user using the second instance of the application, wherein the second remote session is a connection with the server for communicating data between the server and the client computing device for the second user; and
launching the second remote session based on the receiving of the input for creating the second remote session from the second user.

68. The method of clause 67, wherein the first remote session and the second remote session are RDP sessions.

69. The method of clause 67, wherein the first remote session and the second remote session are ICA sessions.

70. A non-transitory machine-readable medium comprising instructions stored therein, the instructions executable by one or more processors to perform one or more operations, the instructions comprising:
code for causing the one or more processors to retrieve a plurality of I/O device groups, wherein a first I/O device group in the plurality of I/O device groups is associated with a first group of input or output (IO) devices locally connected to a client computing device, and wherein a second I/O device group in the plurality of I/O device groups is associated with a second group of I/O devices locally connected to the client computing device;
code for causing the one or more processors to launch first and second instances of an application;
code for causing the one or more processors to associate the first instance of the application with the first I/O device group on the client computing device; and
code for causing the one or more processors to associate the second instance of the application with the second I/O device group on the client computing device.

71. The non-transitory machine-readable medium of clause 70, further comprising:
code for causing the one or more processors to launch an I/O data manager, wherein the I/O data manager directs input received from one or more devices in the first I/O device group to the first instance of the application and directs input received from one or more devices in the second I/O device group to the second instance of the application, and wherein the I/O data manager directs output received from the first instance of the application to one or more devices in the first I/O device group and directs output received from the second instance of the application to one or more devices in the second I/O device group.

72. The non-transitory machine-readable medium of clause 70, wherein the first instance of the application enables a first user of the first I/O device group and the second instance of the application enables a second user of the second I/O device group to simultaneously share the resources of the client computing device.

73. The non-transitory machine-readable medium of clause 70, wherein the plurality of I/O device groups are retrieved from a storage on the client computing device.

74. The non-transitory machine-readable medium of clause 70, wherein both the first I/O device group and the second I/O device group comprises a monitor and at least one of a pointing device and a keyboard each.

75. The non-transitory machine-readable medium of clause 70, wherein the launching of the first and second instances of the application is done upon the client computing device booting up.

76. The non-transitory machine-readable medium of clause 70, wherein the launching of the first and second instances of the application is done upon a first user of the client computing device logging onto the client computing device.

77. The non-transitory machine-readable medium of claim 76, wherein the first user logs onto the client computing device using a Windows system login.

78. The non-transitory machine-readable medium of claim 76, wherein the first user logs onto the client computing device using a Linux system login.

79. The non-transitory machine-readable medium of clause 70, wherein the application is a desktop shell application.

80. The non-transitory machine-readable medium of clause 70, wherein the application is a remote connection manager application.

81. The non-transitory machine-readable medium of clause 70, wherein the launching of the first and second instances of the application comprises launching, for each of the first and second instances of the application, a custom login screen for the application on an output device in the respective I/O device group.

82. The non-transitory machine-readable medium of clause 70, further comprising:
code for causing the one or more processors to receive input for creating a first remote session from a first user using the first instance of the application, wherein the first remote session is a connection with a server for communicating data between the server and the client computing device for the first user;
code for causing the one or more processors to launch the first remote session based on the receiving of the input for creating the first remote session from the first user;
code for causing the one or more processors to receive input for creating a second remote session from a second user using the second instance of the application, wherein the second remote session is a connection with the server for communicating data between the server and the client computing device for the second user; and
code for causing the one or more processors to launch the second remote session based on the receiving of the input for creating the second remote session from the second user.

83. The non-transitory machine-readable medium of claim 82, wherein the first remote session and the second remote session are RDP sessions.

84. The non-transitory machine-readable medium of claim 82, wherein the first remote session and the second remote session are ICA sessions.

85. An apparatus comprising:
one or more modules configured to retrieve a plurality of I/O device groups, wherein a first I/O device group in the plurality of I/O device groups is associated with a first group of input or output (IO) devices locally connected to a client computing device, and wherein a second I/O device group in the plurality of I/O device groups is associated with a second group of I/O devices locally connected to the client computing device;

one or more modules configured to launch first and second instances of an application;

one or more modules configured to associate the first instance of the application with the first I/O device group on the client computing device; and one or more modules configured to associate the second instance of the application with the second I/O device group on the client computing device.

86. The apparatus of clause 85, further comprising:

one or more modules configured to launch an I/O data manager, wherein the I/O data manager directs input received from one or more devices in the first I/O device group to the first instance of the application and directs input received from one or more devices in the second I/O device group to the second instance of the application, and wherein the I/O data manager directs output received from the first instance of the application to one or more devices in the first I/O device group and directs output received from the second instance of the application to one or more devices in the second I/O device group.

87. The apparatus of clause 85, wherein the first instance of the application enables a first user of the first I/O device group and the second instance of the application enables a second user of the second I/O device group to simultaneously share the resources of the client computing device.

88. The apparatus of clause 85, wherein the plurality of I/O device groups are retrieved from a storage on the client computing device.

89. The apparatus of clause 85, wherein both the first I/O device group and the second I/O device group comprises a monitor and at least one of a pointing device and a keyboard each.

90. The apparatus of clause 85, wherein the launching of the first and second instances of the application is done upon the client computing device booting up.

91. The apparatus of clause 85, wherein the launching of the first and second instances of the application is done upon a first user of the client computing device logging onto the client computing device.

92. The apparatus of clause 91, wherein the first user logs onto the client computing device using a Windows system login.

93. The apparatus of clause 91, wherein the first user logs onto the client computing device using a Linux system login.

94. The apparatus of clause 85, wherein the application is a desktop shell application.

95. The apparatus of clause 85, wherein the application is a remote connection manager application.

96. The apparatus of clause 85, wherein the launching of the first and second instances of the application comprises launching, for each of the first and second instances of the application, a custom login screen for the application on an output device in the respective I/O device group.

97. The apparatus of clause 85, further comprising:

one or more modules configured to receive input for creating a first remote session from a first user using the first instance of the application, wherein the first remote session is a connection with a server for communicating data between the server and the client computing device for the first user;

one or more modules configured to launch the first remote session based on the receiving of the input for creating the first remote session from the first user;

one or more modules configured to receive input for creating a second remote session from a second user using the second instance of the application, wherein the second remote session is a connection with the server for communicating data between the server and the client computing device for the second user; and one or more modules configured to launch the second remote session based on the receiving of the input for creating the second remote session from the second user.

98. The apparatus of clause 97, wherein the first remote session and the second remote session are RDP sessions.

99. The non-transitory machine-readable medium of claim 82, wherein the first remote session and the second remote session are ICA sessions.

100. A computer-implemented method for multiple users simultaneously sharing one client computing device, the method comprising:

enabling logging on by a first user onto a client computing device;

enabling launching of a first instance of an application on the client computing device for display at a first monitor locally connected to the client computing device, wherein the first user is enabled to interact with first instance of the application to perform computing tasks for the first user;

enabling logging on by a second user onto the client computing device; and enabling launching a second instance of the application on the client computing device for display at a second monitor locally connected to the client computing device, wherein the second user is enabled to interact with second instance of the application to perform computing tasks for the second user.

101. The computer-implemented method of claim 55, wherein the application is a desktop shell application.

102. The computer-implemented method of claim 55, wherein at least one of the computing tasks is to create a remote session, wherein the remote session is a connection between the client computing device and a server for exchanging data between the client computing device and the server.

103. A computer-implemented method for multiple users simultaneously sharing one client computing device, the method comprising:

detecting input devices connected to a client computing device;

adding the detected input devices connected to the client computing device to a list of available input devices for the client computing device;

detecting output devices connected to the client computing device;

adding the detected output devices connected to the client computing device to a list of available output devices for the client computing device;

grouping one or more input devices in the list of input devices with one or more output devices in the list of output devices;

assigning one user for each group in the grouping of input and output devices to allow the client computing device to be simultaneously shared by the multiple users;

storing information about the assigned user for each group in the grouping of input and output devices;

starting a boot process for the client computing machine;

launching one desktop instance per group in the grouping of input and output devices.

Other Remarks

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein (e.g., I/O device grouping in FIG. 7 and multiple application instances launching in FIG. 8, and the components therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof, where an instruction(s) may be software, an application(s), a subroutine(s), or a portion thereof, where the instructions(s) may be for performing the function(s) or operation(s). In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.), a portion(s) or a combination(s) of any of the foregoing. Those skilled in the art will recognize how to implement the instructions, circuits, and processing systems.

In one aspect of the disclosure, when actions or functions (e.g., receiving, assigning, launching, detecting, retrieving, providing) are described as being performed by an item (e.g., one or more of blocks, modules, elements, components or processors), it is understood that such actions or functions may be performed, for example, by the item directly. In another example, when an item is described as performing an action, the item may be understood to perform the action indirectly, for example, by facilitating, enabling or causing such an action. For example, receiving can refer to facilitating receiving, assigning can refer to facilitating assigning, detecting can refer to facilitating detecting, and retrieving can refer to facilitating retrieving. In one aspect, performing an action may refer to performing a portion of the action (e.g., performing a beginning part of the action, performing an end part of the action, or performing a middle portion of the action).

A reference to an element in the singular is not intended to mean "one and only one" unless specifically so stated, but rather "one or more." For example, an input or output device may refer to one or more input or output, an I/O device group may refer to one or more I/O device group, and an input or output data may refer to one or more input or output data.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Terms such as "top," "bottom," "front," "rear" and the like if used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Various items may be arranged differently (e.g., arranged in a different order, or partitioned in a different way) all without departing from the scope of the subject technology. In one example, a single unit (e.g., machine, device, or module) may include multiple machines, devices, or modules. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

For example, an admin application is described for FIG. 7 as implemented as an applet. But any other programming means, e.g., C, C++, JAVA, HTML, etc. may be used to write the admin application. Also, although FIG. 4 illustrates various modules on a client computing device 100 for the subject technology, any other combination of modules may be used instead. For example, device grouping module 429 and admin module 431 may be a single module.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A computer-implemented method for multiple users simultaneously sharing a thin client computing device, the method comprising:

automatically grouping a plurality of input or output (I/O) devices locally connected to a thin client computing device into a plurality of I/O device groups based on an order of enumeration of the plurality of I/O devices, wherein a first I/O device group in the plurality of I/O device groups is associated with a first group of I/O devices locally connected to the thin client computing device, and wherein a second I/O device group in the plurality of I/O device groups is associated with a second group of I/O devices locally connected to the thin client computing device;

launching first and second instances of an application on a remote server;

associating the first instance of the application running on the remote server with the first I/O device group on the thin client computing device to allow a first user using the first I/O device group to create a first remote session with the remote server via the thin client computing device; and associating the second instance of the application running on the remote server with the second I/O device group on the thin client computing device to allow a second user using the second I/O device group to create a second remote session with the remote server via the thin client computing device, the second remote session created simultaneously with the first remote session.

2. The method of claim 1, further comprising:

receiving input for creating the first remote session from the first user using the first instance of the application, wherein the first remote session is a connection with the remote server for communicating data between the remote server and the thin client computing device for the first user;

launching the first remote session based on the receiving of the input for creating the first remote session from the first user;

receiving input for creating the second remote session from the second user using the second instance of the application, wherein the second remote session is a connection with the remote server for communicating data between the remote server and the thin client computing device for the second user; and launching the second remote session based on the receiving of the input for creating the second remote session from the second user.

3. A non-transitory machine-readable medium comprising instructions stored therein, the instructions executable by one or more processors to perform one or more operations, the instructions comprising:

code for causing the one or more processors to automatically group a plurality of input or output (I/O) devices locally connected to a thin client computing device into a plurality of I/O device groups based on an order of enumeration of the plurality of I/O devices, wherein a first I/O device group in the plurality of I/O device groups is associated with a first group of I/O devices locally connected to the thin client computing device, and wherein a second I/O device group in the plurality of I/O device groups is associated with a second group of I/O devices locally connected to the thin client computing device;

code for causing the one or more processors to launch first and second instances of an application on a remote server;

code for causing the one or more processors to associate the first instance of the application running on the remote server with the first I/O device group on the thin client computing device to allow a first user using the first I/O device group to create a first remote session with the remote server via the thin client computing device; and code for causing the one or more processors to associate the second instance of the application running on the remote server with the second I/O device group on the thin client computing device to allow a second user using the second I/O device group to create a second remote session with the remote server via the thin client computing device, the second remote session created simultaneously with the first remote session.

4. The non-transitory machine-readable medium of claim 3, further comprising:

code for causing the one or more processors to launch an I/O data manager, wherein the I/O data manager directs input received from one or more devices in the first I/O device group to the first instance of the application and directs input received from one or more devices in the second I/O device group to the second instance of the application, and wherein the I/O data manager directs output received from the first instance of the application to one or more devices in the first I/O device group and directs output received from the second instance of the application to one or more devices in the second I/O device group.

5. The non-transitory machine-readable medium of claim 3, wherein the first instance of the application enables the first user of the first I/O device group and the second instance of the application enables the second user of the second I/O device group to simultaneously share the resources of the remote server via the thin client computing device.

6. The non-transitory machine-readable medium of claim 3, wherein the plurality of I/O device groups are retrieved from a storage on the thin client computing device.

7. The non-transitory machine-readable medium of claim 3, wherein both the first I/O device group and the second I/O device group comprises a monitor and at least one of a pointing device and a keyboard each.

8. The non-transitory machine-readable medium of claim 3, wherein the first user logs onto the thin client computing device using a Windows system login.

9. The non-transitory machine-readable medium of claim 3, wherein the first user logs onto the thin client computing device using a Linux system login.

10. The non-transitory machine-readable medium of claim 3, wherein the application is a desktop shell application.

11. The non-transitory machine-readable medium of claim 3, wherein the application is a remote connection manager application.

12. The non-transitory machine-readable medium of claim 3, wherein the launching of the first and second instances of the application comprises launching, for each of the first and second instances of the application, a custom login screen for the application on an output device in the respective I/O device group.

13. The non-transitory machine-readable medium of claim 3, further comprising:

code for causing the one or more processors to receive input for creating the first remote session from the first user using the first instance of the application, wherein the first remote session is a connection with the remote server for communicating data between the remote server and the thin client computing device for the first user;

code for causing the one or more processors to launch the first remote session based on the receiving of the input for creating the first remote session from the first user;

code for causing the one or more processors to receive input for creating the second remote session from the second user using the second instance of the application, wherein the second remote session is a connection with the remote server for communicating data between the remote server and the thin client computing device for the second user; and code for causing the one or more processors to launch the second remote session based on the receiving of the input for creating the second remote session from the second user.

14. The non-transitory machine-readable medium of claim 13, wherein the first remote session and the second remote session are RDP sessions.

15. The non-transitory machine-readable medium of claim 13, wherein the first remote session and the second remote session are ICA sessions.

16. The non-transitory machine-readable medium of claim 13, wherein the first remote session and the second remote session are VMView sessions.

17. An information handling system, comprising:

a processor;

a memory communicatively coupled to the processor;

an admin module including instructions in the memory, the instructions executable by the processor, the instructions, when executed, configure the processor to:

automatically group a plurality of input or output (I/O) devices locally connected to a thin client computing device into a plurality of I/O device groups based on an order of enumeration of the plurality of I/O devices, wherein a first I/O device group in the plurality of I/O device groups is associated with a first group of I/O devices locally connected to the thin client computing device, and wherein a second I/O device group in the plurality of I/O device groups is associated with a second group of I/O devices locally connected to the thin client computing device;

launch first and second instances of an application on a remote server;

associate the first instance of the application running on the remote server with the first I/O device group on the thin client computing device to allow a first user using the first I/O device group to create a first remote session with the remote server via the thin client computing device; and associate the second instance of the application running on the remote server with the second I/O device group on the thin client computing device to allow a second user using the second I/O device group to create a second remote session with the remote server via the thin client computing device, the second remote session created simultaneously with the first remote session.

18. The information handling system of claim 17, wherein the instructions, when executed, further configure the admin module to:

receive input for creating the first remote session from the first user using the first instance of the application, wherein the first remote session is a connection with the remote server for communicating data between the remote server and the thin client computing device for the first user;

launch the first remote session based on the receiving of the input for creating the first remote session from the first user;

receive input for creating the second remote session from the second user using the second instance of the application, wherein the second remote session is a connection with the remote server for communicating data between the remote server and the thin client computing device for the second user; and launch the second remote session based on the receiving of the input for creating the second remote session from the second user.

* * * * *